(12) United States Patent
Fujine et al.

(10) Patent No.: US 9,319,620 B2
(45) Date of Patent: Apr. 19, 2016

(54) VIDEO DISPLAY DEVICE AND TELEVISION RECEIVING DEVICE INCLUDING LUMINANCE STRETCHING

(75) Inventors: Toshiyuki Fujine, Osaka (JP); Yoji Shiraya, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/375,048

(22) PCT Filed: Jul. 10, 2012

(86) PCT No.: PCT/JP2012/067598
§ 371 (c)(1),
(2), (4) Date: Jul. 28, 2014

(87) PCT Pub. No.: WO2013/121600
PCT Pub. Date: Aug. 22, 2013

(65) Prior Publication Data
US 2015/0009411 A1  Jan. 8, 2015

(30) Foreign Application Priority Data

Feb. 15, 2012 (JP) ................................. 2012-030381

(51) Int. Cl.
*H04N 5/57* (2006.01)
*H04N 5/66* (2006.01)
*G09G 3/34* (2006.01)
(Continued)

(52) U.S. Cl.
CPC ............... *H04N 5/57* (2013.01); *G09G 3/3426* (2013.01); *H04N 5/66* (2013.01); *H04N 9/12* (2013.01); *H04N 9/73* (2013.01);
(Continued)

(58) Field of Classification Search
CPC ... H04N 5/20; H04N 5/57; G09G 2320/0646; G09G 2320/0238; G09G 2320/16; G09G 2320/066; G09G 3/36; G09G 3/3426; G09G 3/3413
See application file for complete search history.

(56) References Cited

U.S. PATENT DOCUMENTS 5,515,113 A * 5/1996 Takeshima .................... 348/687
8,537,175 B1 * 9/2013 Toderici et al. ............... 345/591
(Continued)

FOREIGN PATENT DOCUMENTS

| CN | 101211537 A | 7/2008 |
|---|---|---|
| JP | 2002-202767 A | 7/2002 |

(Continued)

*Primary Examiner* — Victor Kostak
(74) *Attorney, Agent, or Firm* — Birch, Stewart, Kolasch & Birch, LLP

(57) ABSTRACT

A light emission portion of a video signal is detected, and the display intensity of the light emission portion is enhanced for emphasis display. At this moment, the intensity stretch amount is controlled in accordance with a status of video black display, thereby increasing the feeling of brightness and hence improving the video quality. An area-active-control/luminance-stretching portion stretches and increases the intensity of a backlight portion on the basis of an index related to a brightness calculated, on the basis of a predetermined condition, from the input video signal, and lowers the video signal intensity of the non-light emission part excluding the light emission part. At this moment, the area-active-control/luminance-stretching portion changes, in accordance with a black display amount detected by a black detection portion, a control curve that defines the relationship between the index related to the brightness and the stretch amount.

6 Claims, 16 Drawing Sheets

(51) Int. Cl.
  *H04N 9/12* (2006.01)
  *H04N 9/73* (2006.01)
  *H04N 5/16* (2006.01)

(52) U.S. Cl.
  CPC ... *G09G 2320/0646* (2013.01); *G09G 2360/16* (2013.01); *H04N 5/165* (2013.01)

(56) References Cited

U.S. PATENT DOCUMENTS

| | | | |
|---|---|---|---|
| 2002/0130830 A1 | 9/2002 | Park | |
| 2002/0196371 A1* | 12/2002 | Gai et al. | 348/691 |
| 2003/0103164 A1* | 6/2003 | Numata | 348/448 |
| 2004/0257318 A1 | 12/2004 | Itoh | |
| 2005/0162564 A1* | 7/2005 | Sakaguchi | 348/687 |
| 2005/0174320 A1 | 8/2005 | Park | |
| 2006/0256240 A1* | 11/2006 | Oka et al. | 348/630 |
| 2007/0041636 A1* | 2/2007 | Yoon et al. | 382/169 |
| 2010/0278423 A1 | 11/2010 | Itoh et al. | |
| 2010/0328535 A1* | 12/2010 | Okui et al. | 348/578 |
| 2011/0025728 A1 | 2/2011 | Baba et al. | |

FOREIGN PATENT DOCUMENTS

| | | |
|---|---|---|
| JP | 2004-258669 A | 9/2004 |
| JP | 2004-325628 A | 11/2004 |
| JP | 2007-322901 A | 12/2007 |
| JP | 2009-063694 A | 3/2009 |
| JP | 2010-271480 A | 12/2010 |

\* cited by examiner

FIG.2
(A)
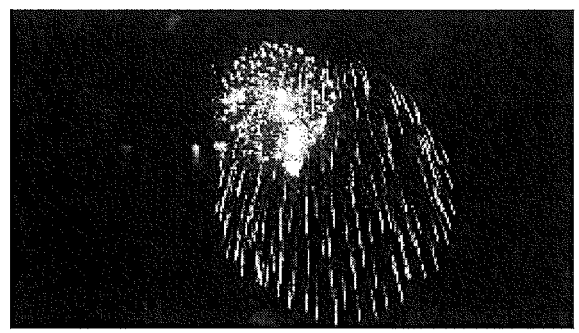
(B)
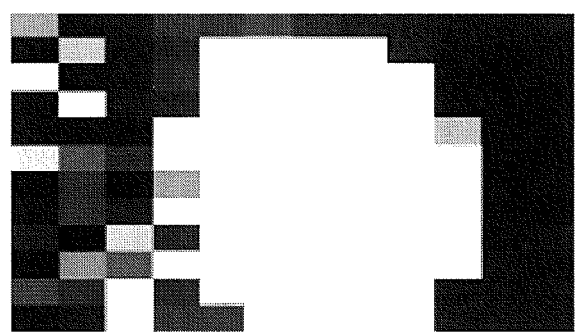

(A)

| 0 | 128 | 8 |
|---|---|---|
| 16 | 32 | 64 |
| 96 | 96 | 0 |

(B)

BACKLIGHT LIGHTING RATE
21.7%

(C)

| 0 | 255 | 16 |
|---|---|---|
| 32 | 64 | 128 |
| 192 | 192 | 0 |

VIDEO DISPLAY DEVICE AND TELEVISION RECEIVING DEVICE INCLUDING LUMINANCE STRETCHING

TECHNICAL FIELD

The present invention relates to a video display device and a television receiving device, and more specifically to a video display device having a luminance stretching function of a video signal and a backlight light source to improve image quality of a display video and a television receiving device.

BACKGROUND OF THE INVENTION

In recent years, as to a display technology of a television receiver, a technology of HDR (high dynamic range imaging) for displaying by reproducing what exists in nature faithfully has been studied actively. One of the objects of the HDR is that, for example, a luminescent color part such as fireworks and neon in a screen is reproduced faithfully to provide feeling of brightness.

In this case, a luminescent color and an object color are detected by a light emission detection function to be separated, and by signal processing and light emission luminance control of a backlight, only the luminescent color on the screen is able to be made brighter. Here, in a video that changes variously, a part that emits light relatively brightly is detected from a distribution of luminance of the video, and the light emitting part is stretched consciously, so that it is possible to obtain effect of improving image quality by emphasizing the part that emits light on the screen more.

As a conventional technology, for example, Patent Literature 1 discloses a display device aiming to make a screen look much brighter without increasing power consumption and without ruining a video. This display device sets a reference light emission luminance for setting a light emission luminance level of a backlight light source from a video feature quantity such as APL. Further, a gain for keeping luminance in terms of vision is set to be linked with the reference light emission luminance level and a tone curve is generated based on the gain. Meanwhile, a geometric average value is obtained for a video generated based on a histogram of the video, the gain is calculated based on the geometric average value, and a tone curve for correction is generated based on the calculated gain. Then, the tone curve linked with the above-described reference light emission luminance level is corrected according to the tone curve for correction, and applied to a video signal.

PRIOR ART DOCUMENT

Patent Documents

Patent Document 1: Japanese Laid-Open Patent Publication No. 2010-271480

SUMMARY OF THE INVENTION

Problem to be Solved by the Invention

As described above, in the technology of the HDR, by detecting a light emitting part which is brilliant brightly in a screen and stretching display luminance of the light emitting part, contrast feeling is improved for human eyes and feeling of brightness is increased, thus making it possible to provide a high-definition display video.

When the HDR is operated under a constant condition regardless of a state of a video, however, there is a case where quality of some videos degrades. For example, in such a case where a screen is dark having a lot of areas corresponding to black, when screen luminance is increased uniformly by signal processing with the HDR and luminance stretching of the backlight, there is a case where so-called black float is caused in display areas of black and contrast feeling is failed to degrade quality of a video.

The video display device of the Patent Literature 1 corrects the tone curve that is generated to be linked with the light emission luminance level that is set using the APL or the like, with the tone curve that is generated based on the geometric average value which is a video feature quantity close to a human sensory quantity, to thereby make a screen look much brighter, but is not for detecting a light emitting part to stretch the luminance at that time, and does not disclose an idea that a light emitting part in a screen is particularly emphasized to be made brighter, and, at this time, degree of luminance stretching is controlled according to a state of a video to thereby prevent degrading video quality such as black float.

The present invention has been made in view of circumstances as described above, and aims to provide a video display device that detects a part of a video signal that emits light, and stretches and emphasizes display luminance of the light emitting part for displaying, to thereby perform display with feeling of brightness much increased and with high contrast, and at this time, controls luminance stretching according to a state of black display of a video to thereby represent a high-definition video at all times, and a television receiving device.

Means for Solving the Problem

To solve the above problems, a first technical means of the present invention is a video display device comprising: a display portion for displaying an input video signal; a light source for illuminating the display portion; and a control portion for controlling the display portion and the light source, wherein the control portion stretches and increases luminance of the light source based on control curves that define a relation between an index associated with brightness calculated based on a predetermined condition from the input video signal and a luminance stretch quantity for stretching the luminance of the light source, and detects a light emitting part that is regarded as a video emitting light based on a predetermined feature quantity of the input video signal and reducing luminance of a video signal of a non-light emitting part excluding the light emitting part, to thereby enhance display luminance of the light emitting part, wherein the video display device has a black detection portion for detecting a quantity of black display based on a predetermined condition for black detection from the input video signal, and the control portion switches the control curves according to the quantity of black display detected by the black detection portion.

A second technical means is the video display device of the first technical means, wherein the control portion divides an image by the input video signal into a plurality of areas, and changes a corresponding lighting rate of the light source for each of the areas based on a tone value of a video signal of the divided area, the control curve is a control curve that defines a relation between an average lighting rate obtained by averaging the lighting rates corresponding to all areas and a luminance stretch quantity shown by possible maximum luminance on a screen of the display portion, and the control portion uses the average lighting rate as the index associated with the brightness to stretch the luminance of the light source based on the maximum luminance defined in accordance with the average lighting rate.

A third technical means is the video display device of the first technical means, wherein the control curve is a control curve in which the luminance stretch quantity becomes smaller as the quantity of black display detected by the black detection portion is increased.

A fourth technical means is the video display device of the first technical means, wherein the control curve is a control curve that defines a relation between a score obtained by counting the number of pixels by weighting brightness of each pixel and the luminance stretch quantity with respect to a video in a predetermined range including an area of the detected light emitting part, and the control portion uses the score as the index associated with the brightness to stretch the luminance of the light source based on the score that is calculated from the input video signal.

A fifth technical means is the video display device of the fourth technical means, wherein the control curve is a control curve in which the luminance stretch quantity becomes smaller as the quantity of black display detected by the black detection portion is reduced.

A sixth technical means is the video display device of the second technical means, wherein the control portion performs video processing for converting and outputting an input tone of the input video signal, input/output characteristics that define a relation between the input tone and an output tone have a threshold that is defined in an area of a non-light emitting part having a lower tone than a boundary of the light emitting part and the non-light emitting part, and the control portion predefines a relation between a gain applied to the video signal and the luminance stretch quantity, determines a gain by which the output tone is reduced with respect to the input tone of the input video signal in accordance with the luminance stretch quantity, applies the determined gain to an area having a lower tone than the threshold to perform the video processing, and moves the threshold to a high-tone side as the quantity of black display detected by the black detection portion is increased in the video processing.

A seventh technical means is the video display device of the sixth technical means, wherein the control portion reduces an increment of display luminance of the display portion by stretching of the luminance of the light source through the video processing in a predetermined area having the low feature quantity.

An eighth technical means is a television receiving device including the video display device of the first technical means.

Effect of the Invention

According to the video display device of the present invention, it is possible to provide a video display device that detects a part of a video signal that emits light, and stretches and emphasizes display luminance of the light emitting part for displaying, to thereby perform display with feeling of brightness much increased and with high contrast, and at this time, controls luminance stretching according to a state of black display of a video to thereby represent a high-definition video at all times, and a television receiving device.

BRIEF DESCRIPTION OF DRAWINGS

FIG. 2 is a diagram explaining control processing of a light emitting area in an area-active-control/luminance-stretching portion.

PREFERRED EMBODIMENT OF THE INVENTION

Embodiment 1

Figure 1:
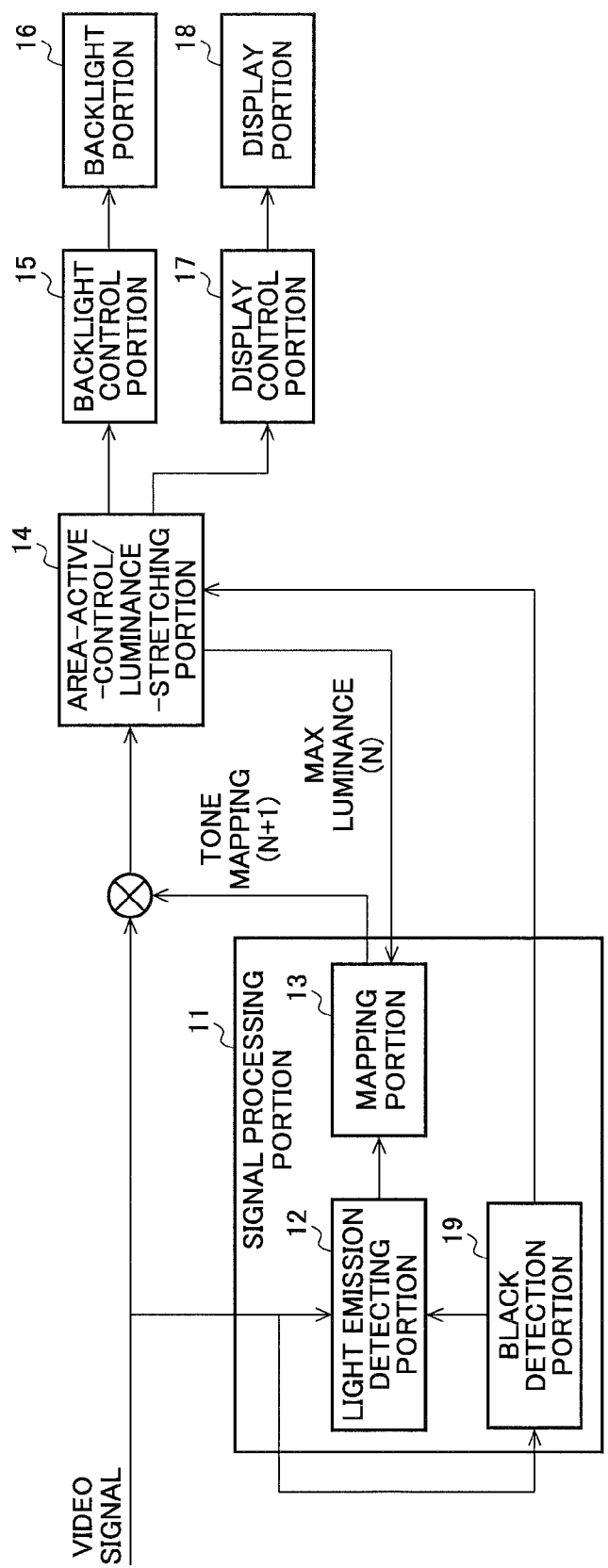
FIG. 1 is a diagram explaining an embodiment of a video display device according to the present invention, which shows a main configuration of the video display device.

FIG. 1 is a diagram explaining an embodiment of a video display device according to the present invention, which shows a main configuration of the video display device. The video display device has a configuration to perform image processing for an input video signal to display a video, and is applicable to a television receiving device and the like.

A video signal separated from a broadcast signal and a video signal input from external equipment are input to a signal processing portion 11 and an area-active-control/luminance-stretching portion 14. At this time, the video signal to the area-active-control/luminance-stretching portion 14 is applied with tone mapping generated by a mapping portion 13 of the signal processing portion 11, and then input to the area-active-control/luminance-stretching portion 14.

A light emission detecting portion 12 of the signal processing portion 11 generates a histogram for each frame based on a feature quantity of an input video signal and detects a part that emits light. The part that emits light is obtained by an average value and a standard deviation of the histogram, and is detected as a relative value for each histogram.

A black detection portion 19 of the signal processing portion 11 detects a quantity (the number of pixels) corresponding to black display from an input video signal in accordance with a predefined condition. Description will be given below with a quantity corresponding to black display simply as a quantity of black and with processing for detecting a quantity corresponding to black display as black detection processing.

The black detection portion 19 detects a quantity of black for each frame by predetermined operation processing from the input video signal. Then, based on a predefined relation between the quantity of black and luminance enhancement proportion of a backlight, luminance enhancement proportion according to the detected quantity of black is determined. The determined luminance enhancement proportion is output to the area-active-control/luminance-stretching portion 14. The luminance enhancement proportion of the present embodiment is used for restricting and adjusting, according to a quantity of black display, a luminance stretch quantity of the backlight that is defined according to an average lighting rate of the backlight.

The mapping portion 13 generates tone mapping by using information of the light emitting part detected by the light emission detecting portion 12 and Max luminance output from the area-active-control/luminance-stretching portion 14 to apply to the input video signal. The Max luminance shows maximum luminance that is desired to be displayed on a screen and corresponds to a luminance stretch quantity of a backlight.

In accordance with the input video signal, the area-active-control/luminance-stretching portion 14 divides an image by the video signal into predetermined areas to extract a maximum tone value of the video signal for each of the divided areas. Then, a lighting rate of a backlight portion 16 is calculated based on the maximum tone value. The lighting rate is defined for each area of the backlight portion 16 corresponding to a divided area of a video. In addition, the backlight portion 16 is configured by a plurality of LEDs and is able to control luminance for each area.

The lighting rate in each area of the backlight portion 16 is determined based on a predefined operation expression, in which operation is performed basically in such a way as to keep luminance of an LED without reducing in a bright high-tone area with a maximum tone value while reducing luminance of an LED in a dark low-tone area.

Then, the area-active-control/luminance-stretching portion 14 calculates an average lighting rate of the entire backlight portion 16 from a lighting rate of each area, and according to the average lighting rate, calculates a luminance stretch quantity of the backlight portion 16 by a predetermined operation expression. Thereby, a possible maximum luminance value (Max luminance) of an area in a screen is obtained. With respect to Max luminance obtained here, Max luminance is adjusted based on a black detection result by the black detection portion 19, and output to the mapping portion 13 of the signal processing portion 11.

In the area-active-control/luminance-stretching portion 14, then, Max luminance adjusted according to the result of detecting the quantity of black is returned to the signal processing portion 11 to reduce luminance corresponding to a quantity of luminance stretching of the backlight portion 16. At this time, the luminance stretching is given to the entire backlight portion 16, and reduction of luminance by video signal processing is performed for a part that is regarded as not emitting light, excluding a light emitting part. Thereby, screen luminance of only the part that emits light is increased, thus making it possible to perform video representation with high contrast and improve image quality.

The area-active-control/luminance-stretching portion 14 outputs control data for controlling the backlight portion 16 to a backlight control portion 15, and the backlight control portion 15 controls light emission luminance of the LED of the backlight portion 16 for each divided area based on the data. Luminance of the LED of the backlight portion 16 is subjected to PWM (Pulse Width Modulation) control, and is also able to be controlled to have a desired value by current control or a combination thereof.

Further, the area-active-control/luminance-stretching portion 14 outputs control data for controlling a display portion 18 to a display control portion 17, and the display control portion 17 controls display of the display portion 18 based on the data. A liquid crystal panel that displays an image with illumination by the LED of the backlight portion 16 is used for the display portion 18.

Note that, in the present embodiment, a control portion of the present invention is for controlling the backlight portion 16 and the display portion 18, and corresponds to the signal processing portion 11, the area-active-control/luminance-stretching portion 14, the backlight control portion 15 and the display control portion 17.

When the above-described display device is configured as a television receiving device, the television receiving device has means for selecting a broadcast signal received by an antenna for demodulating and decoding to generate a video signal for playing, and applies predetermined image processing as appropriate to the video signal for playing for inputting as the input video signal of FIG. 1. This makes it possible to cause the display portion 18 to display the received broadcast signal. The present invention is able to be configured as a display device, and a television receiving device provided with the display device.

More specific description will be given below for exemplary processing of each portion of the present embodiment having the above-described configuration.

Figure 3:
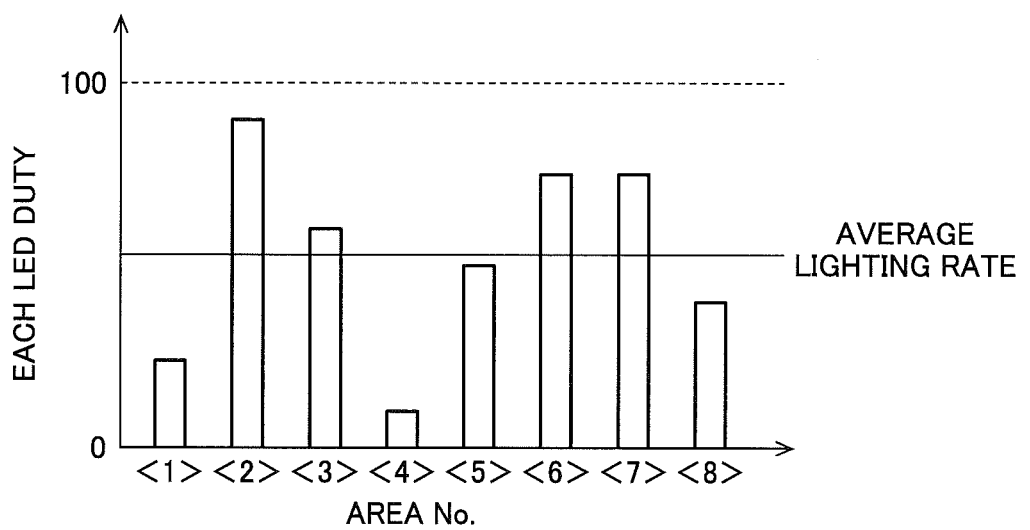
FIG. 3 is another diagram explaining control processing of a light emitting area in the area-active-control/luminance-stretching portion.

The area-active-control/luminance-stretching portion 14 divides a video into a predetermined plurality of areas, and controls light emission luminance of the LED corresponding to the divided areas for each area. FIG. 2 to FIG. 3 are diagrams explaining control processing of a light emitting area in the area-active-control/luminance-stretching portion 14. The area active control applied to the present embodiment is for dividing a video into a predetermined plurality of areas and controlling light emission luminance of the LED corresponding to the divided areas for each area.

Here, the area-active-control/luminance-stretching portion 14 divides a video of one frame into a predefined plurality of areas based on an input video signal, and extracts a maximum tone value of the video signal for each divided area. For example, a video as shown in FIG. 2(A) is divided into a predefined plurality of areas. Here, the maximum tone value of the video signal for each area is extracted. In another example, not the maximum tone value but other statistical values such as an average tone value of the video signal may be used. Description will be given below with an example in which a maximum tone value is extracted.

The area-active-control/luminance stretching portion 14 determines a lighting rate of the LED for each area according to the extracted maximum tone value. A situation in the lighting rate of the LED of each area at this time is shown in FIG. 2(B). Bright display is performed with the lighting rate of the LED increased for a bright part where a tone of the video signal is high. Processing at this time will be described more specifically.

An example of a situation when a maximum tone value of each divided area of one frame is extracted is shown in FIG. 3. In FIG. 3, for simplifying description, it is set that a screen of one frame is divided into eight areas (areas <1> to <8>). Lighting rates of the respective areas (areas <1> to <8>) are shown in FIG. 3 (A), and lighting rates of the respective areas and an average lighting rate of the entire screen are shown in FIG. 3 (B). Here, from a maximum tone value in each area, a lighting rate of the LED of the backlight in the area is calculated. The lighting rate is able to be indicated by, for example, a drive duty of the LED. In this case, the Max lighting rate is 100%.

When determining the lighting rate of the LED of each area, the lighting rate is decreased to reduce the luminance of the backlight for a dark area where the maximum tone value is low. As an example, when being represented by 8-bit data with a tone value of a video of 0 to 255, if the maximum tone value is 128, the backlight is reduced to $(1/(255/128))^{2.2}=0.217$ time (21.7%)).

In the example of FIG. 3, the lighting rate of the backlight is determined in a range of 10 to 90% for each area. This method for calculating a lighting rate shows an example thereof, and the light rate in each area is calculated in accordance with a predefined operation expression basically so as not to reduce backlight luminance in a bright high-tone area but to reduce luminance of the backlight in a dark low-tone area.

Then, lighting rates of the backlight for each area calculated from the maximum tone value of the video signal are averaged to calculate the average lighting rate of the backlight in one frame. In this example, the average lighting rate becomes a level of the average lighting rate shown in FIG. 3(B). The average lighting rate is an example of an index associated with brightness according to the present invention.

Figure 4:
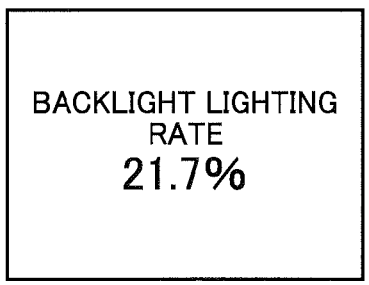
FIG. 4 is a diagram specifically explaining determination processing of an average lighting rate.

FIG. 4 is a diagram explaining determination processing of the average lighting rate more specifically. As described above, when determining the lighting rate of the LED of each area, the lighting rate is decreased to reduce the luminance of the backlight for a dark area where the maximum tone value is low. Here, the actual lighting rate in each area is determined so that tone which is desired to be displayed is displayed correctly and the LED duty is reduced as much as possible. While it is desired to reduce the LED duty as much as possible in each area, it is necessary to perform display correctly without collapsing tone which is desired to be displayed, so that the LED duty by which the maximum tone in the area is able to be displayed and the LED duty is reduced as much as possible (tentative lighting rate) is set and tone of the display portion 18 (here, LCD panel) is set based on it.

As an example, description will be given for a case of being represented by 8-bit data with a tone value of a video of 0 to 255 and a case where tone values of a plurality of pixels in one area of FIG. 3(A) are shown in FIG. 4(A). Here, it is set that nine pixels correspond to one area. In a pixel group shown in FIG. 4(A), the maximum tone value is 128, and in this case, as shown in FIG. 4(B), a lighting rate of the backlight in the area is reduced to $(1/(255/128))^{2.2}=0.217$ time (21.7%).

Further, as an example, the area-active-control/luminance stretching portion 14 determines the lighting rate in this manner and calculates a tone value for each pixel in the display portion 18 by considering the lighting rate for the area in which the pixel is included. For example, when the tone value that is desired to be displayed is 96, 96/(128/255)=192, so that the pixel may be represented using the tone value of 192. In the same manner, a result of calculating tone values when being displayed for each pixel of FIG. 4(A) is shown in FIG. 4(C).

The actual luminance of the backlight portion 16 is further stretched and intensified based on a value of Max luminance determined according to the average lighting rate. Reference luminance as an origin thereof is, for example, such luminance that screen luminance at a time of the maximum tone value is 550 (cd/m$^2$). The reference luminance is not limited to this example and is able to be defined as appropriate.

Figure 5:
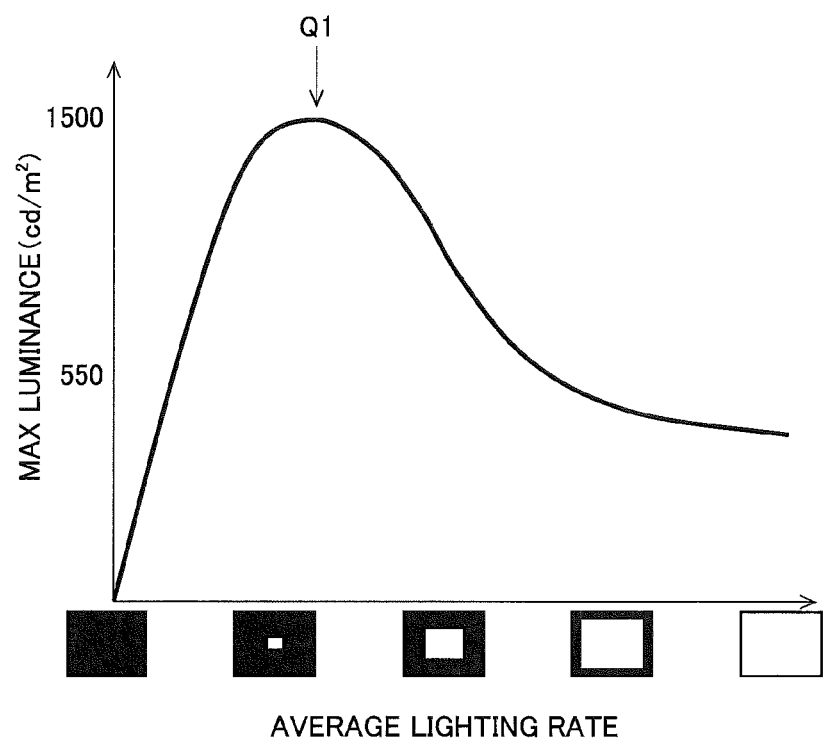
FIG. 5 is a diagram explaining exemplary processing of the area-active-control/luminance-stretching portion.

FIG. 5 is a diagram explaining exemplary processing of the area-active-control/luminance-stretching portion 14. As described above, the area-active-control/luminance-stretching portion 14 calculates the average lighting rate of the entire screen from the lighting rates determined according to the maximum tone value in each area. When an area in which the lighting rate is high is increased, the average lighting rate of the entire screen becomes higher. Then, a possible maximum value of luminance (Max luminance) in a relation like FIG. 5 is determined. A horizontal axis indicates a lighting rate of the backlight (window size) and a vertical axis indicates screen luminance in Max luminance (cd/m$^2$). The average lighting rate is able to be expressed as a ratio of a lit area (window area) with the lighting rate of 100% to an unlit area with the lighting rate of 0%. The lighting rate is 0 in a state of having no lit area, and the lighting rate increases as a window of a lit area becomes larger and the lighting rate reaches 100% when completely lit.

In FIG. 5, it is set that Max luminance when the back light is completely lit (average lighting rate of 100%) is, for example, 550 (cd/m$^2$). Then, as the average lighting rate decreases, Max luminance is increased. At this time, a pixel having a tone value of 255th tone (in the case of 8-bit representation) has the highest screen luminance in the screen, which is possible maximum screen luminance (Max luminance). Accordingly, it is found that, even with the same average lighting rate, the screen luminance is not upped by Max luminance depending on the tone value of the pixel.

When the average lighting rate is Q1, Max luminance has the largest value, and the maximum screen luminance at this time is 1500 (cd/m$^2$). That is, the possible maximum screen luminance at P1 is to be stretched to 1500 (cd/m$^2$) compared to 550 (cd/m$^2$) when completely lit. P1 is set at a position where the average lighting rate is relatively low. That is, in the case of such a screen that is a wholly dark screen having low average lighting rate and that has a high-tone peak partially, the luminance of the backlight is stretched to be 1500 (cd/m$^2$) at a maximum. Further, as a reason why degree of stretching of the luminance of the backlight is small as the average lighting rate becomes higher, because it feels dazzling instead when performing excessively for the luminance of the backlight in an originally bright screen, it is required to suppress degree of stretching.

While Max luminance is from the maximum average lighting rate of Q1 to the average lighting rate of 0 (perfectly black), the value of Max luminance is gradually reduced. A range where the average lighting rate is low corresponds to a video of a dark screen, and rather than the luminance of the backlight is stretched to up the screen luminance, the luminance of the backlight is suppressed to the contrary to improve contrast so that black float is suppressed to keep display quality.

The area-active-control/luminance-stretching portion 14 stretches the luminance of the backlight in accordance with a curve of FIG. 5, and outputs a control signal thereof to the backlight control portion 15. Here, the average lighting rate changes according to the maximum tone value detected for each divided area of the video as described above, and a state of luminance stretching changes according to the average lighting rate.

A video signal input to the area-active-control/luminance-stretching portion 14 is applied with tone mapping generated by signal processing of the signal processing portion 11 described below to be input having a low-tone area with gain decreased. Thereby, the luminance is reduced by the video signal by a quantity of the stretched luminance of the backlight in a non-light emitting area with low tone, resulting that screen luminance is enhanced only in an area that emits light, thus increasing feeling of brightness.

The area-active-control/luminance-stretching portion 14 outputs the value of Max luminance obtained from the average lighting rate of the backlight and the black detection result output from the black detection portion 19 in accordance with the curve of FIG. 5 to the mapping portion 13 of the signal processing portion 11. The mapping portion 13 performs tone mapping using Max luminance output from the area-active-control/luminance-stretching portion 14.

The signal processing portion 11 will be described.

Figure 6:
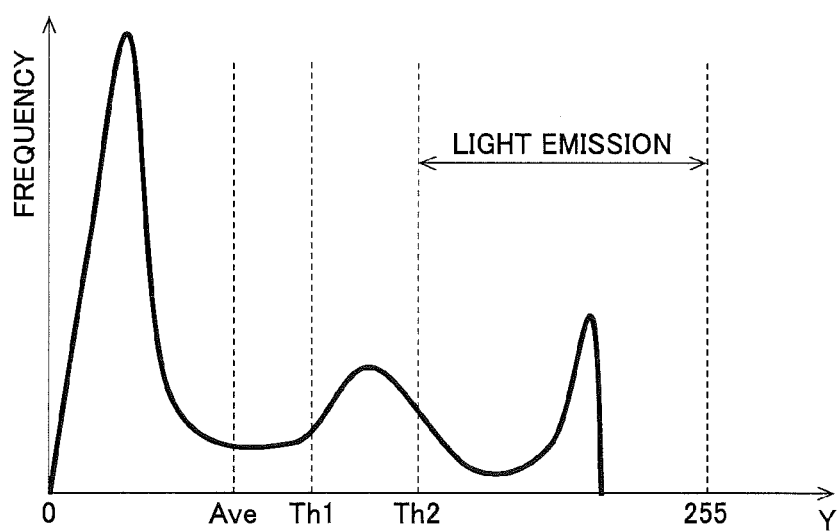
FIG. 6 is a diagram showing an example of a Y histogram generated from a luminance signal Y.

The light emission detecting portion 12 of the signal processing portion 11 detects a part that emits light from a video signal. FIG. 6 shows an example of a Y histogram generated from a luminance signal Y. The light emission detecting portion 12 integrates the number of pixels for each luminance tone to generate a Y histogram for each frame of an input video signal. A horizontal axis indicates a tone value of luminance Y, and a vertical axis indicates the number of pixels integrated for each tone value (frequency). The luminance Y is one of feature quantities of a video for which a histogram is generated, and another example of feature quantities will be described below. Here, it is set to detect a light emitting part as to the luminance Y.

When the Y histogram is generated, an average value (Ave) and a standard deviation ($\sigma$) are calculated from the Y histogram, which are used for calculating two thresholds Th.

A second threshold Th2 is for defining a light emitting boundary, and in the Y histogram, processing is performed for pixels not less than the threshold Th2 which are regarded as a light emitting part.

The second threshold Th2 is provided by:

$$Th2 = Ave + N\sigma \qquad \text{expression (1)}$$

N is a predetermined constant.

In addition, a first threshold Th1 is set so as to suppress incongruity in tones of an area smaller than Th2 and the like, and provided by:

$$Th1 = Ave + M\sigma \qquad \text{expression (2)}$$

M is a predetermined constant, and M<N. Further, a value of M changes according to a result of detecting the quantity of black by the black detection portion 19.

The values of the first and second thresholds Th1 and Th2 detected by the light emission detecting portion 12 are output to the mapping portion 13 and used to generate tone mapping.

Figure 7:
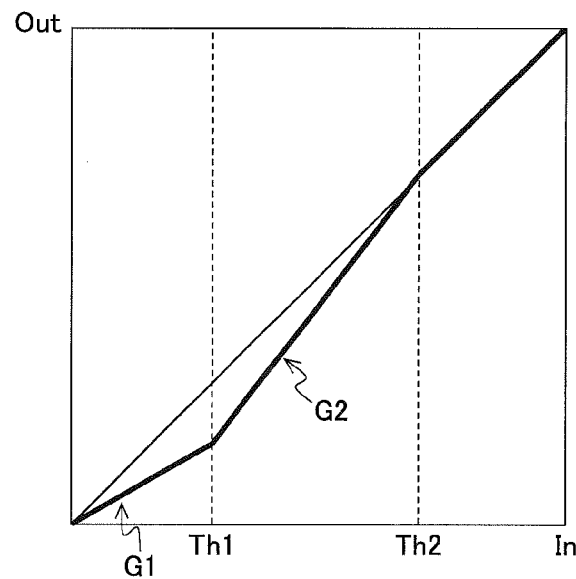
FIG. 7 is a diagram showing an example of tone mapping generated by a mapping portion.

FIG. 7 is a diagram showing an example of tone mapping generated by the mapping portion 13. A horizontal axis is an input tone of a luminance value of a video, and a vertical axis is an output tone. A pixel not less than the second threshold Th2 detected by the light emission detecting portion 12 is a part that emits light in the video, and a compression gain is applied excluding the part that emits light for decreasing a gain. At this time, when a constant compression gain is uniformly applied to an area smaller than Th2 serving as a light emitting boundary to suppress the output tone, there is incongruity arising in tones. Therefore, the first threshold Th1 is set and detected at the light emission detecting portion 12, a first gain G1 is set to an area smaller than Th1, and a second gain G2 is set so as to linearly connect between Th1 and Th2 to perform tone mapping.

Description will be given for a method for setting a gain.

A value of Max luminance is input from the area-active-control/luminance-stretching portion 14 to the mapping portion 13. As described above, Max luminance shows maximum luminance that is defined by an average lighting rate of the backlight and a quantity of black detection output from the black detection portion 19, and is input, for example, as a value of backlight duty.

The first gain G1 is applied to an area smaller than the first threshold Th1, and is set by:

$$G1 = (Ls/Lm)^{1/\gamma} \qquad \text{expression (3)}$$

Ls is reference luminance (reference luminance when backlight luminance is not stretched; as an example, luminance when maximum screen luminance becomes 550 cd/m$^2$), and Lm is Max luminance output from the area-active-control/luminance-stretching portion 14. Accordingly, the first gain G1 that is applied to the area smaller than the first threshold Th1 lowers an output tone of a video signal so as to reduce an increment of screen luminance by luminance stretching of the backlight.

In tone mapping for the second threshold Th2 or more, it is set as f(x)=x. That is, it is set as an input tone=an output tone, and processing for reducing the output tone is not performed. It is set so that the output tone of the first threshold Th1 reduced by the first gain G1 and the output tone of the first threshold Th1 are connected with a straight line from the first threshold Th1 to the second threshold Th2.

That is, the second gain G2 is determined by:

$$G2 = (Th2 - G1 \cdot Th1)/(Th2 - Th1) \qquad \text{expression (4)}$$

By the above-described processing, tone mapping as shown in FIG. 7 is obtained. At this time, for a connecting part of Th1 and Th2, a predetermined range (for example, connecting part±$\Delta$ ($\Delta$ is a predetermined value)) may be subjected to smoothing by a quadratic function.

The tone mapping generated by the mapping portion 13 is applied to an input video signal, and the video signal in which output of a low-tone part is suppressed based on a luminance stretch quantity of the backlight is input to the area-active-control/luminance-stretching portion 14.

Figure 8:
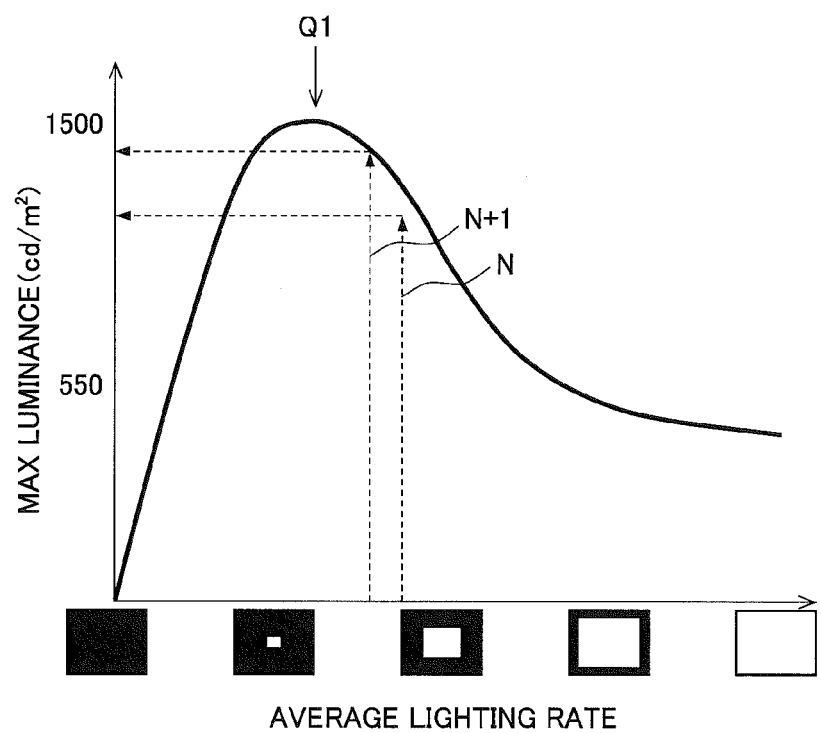
FIG. 8 is a diagram explaining Max luminance output by the area-active-control/luminance-stretching portion.

FIG. 8 is a diagram explaining Max luminance output by the area-active-control/luminance-stretching portion 14.

The area-active-control/luminance-stretching portion 14 inputs the video signal to which tone mapping generated by the mapping portion 13 is applied, and performs area active control based on the video signal to determine Max luminance based on an average lighting rate. At this time, though a control curve of Max luminance changes according to a black detection result from the black detection portion 19, black detection is not considered here for description.

It is set that pa frame that is determined based on the above-described average lighting rate is an N frame. A value of Max luminance of the N frame is output to the mapping portion 13 of the signal processing portion 11. At the mapping portion 13, Max luminance of the N frame that is input is used to generate tone mapping shown in FIG. 7, which is applied to a video signal of an N+1 frame.

In this manner, Max luminance based on an area-active average lighting rate is given feedback to be used for tone mapping for a next frame. The mapping portion 13 applies a gain for reducing video output for the area that is smaller than the first threshold Th1 (first gain G1) based on Max luminance determined in the N frame. The second gain G2 for linearly connecting between Th1 and Th2 is applied to an area between Th1 and Th2 to reduce video output between Th1 and Th2.

Because the gain for reducing video output is applied in the N frame, in an area having a high lighting rate in which an average lighting rate is not less than Q1, the N+1 frame has a trend that a maximum tone value for each area is reduced so that a lighting rate is reduced, and thereby, the N+1 frame has a trend that Max luminance increases. This causes a trend that a luminance stretch quantity of the backlight is further increased to increase feeling of brightness on a screen. However, these trends are not found in an area having a lighting rate lower than Q1, and an opposite trend is found.

Next, description will be given for detection processing of the black detection portion 19 of the signal processing portion 11. In the embodiment according to the present invention, the control curve of Max luminance according to an average lighting rate as shown in FIG. 5 above is changed according to a detection result of a quantity of black in the black detection portion 19. Any one of exemplary processing below is able to be applied as the black detection processing.

(Black Detection Processing 1)

Figure 9:
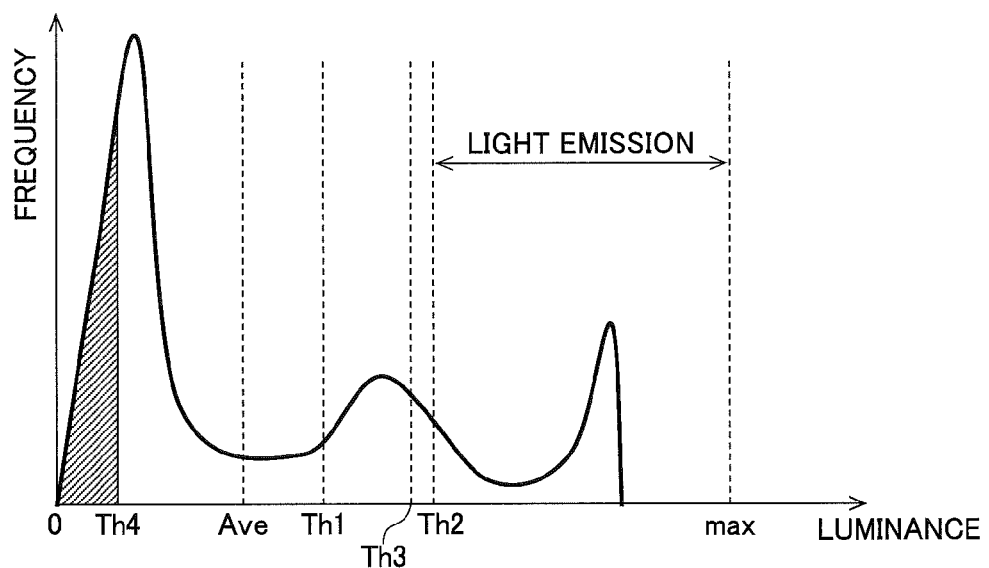
FIG. 9 is a diagram explaining exemplary black detection processing in a black detection portion, which is a diagram showing an example of a luminance histogram of a video signal.

FIG. 9 is a diagram explaining exemplary black detection processing in the black detection portion, which is a diagram showing an example of a luminance histogram of a video signal. In the present example, the black detection portion 19 integrates the number of pixels for each luminance tone to generate a histogram of luminance Y for each frame of the input video signal, by using luminance as a feature quantity of a video signal. As the feature quantity of a video signal, though not a luminance signal but other feature quantity is able to be used, an example of other feature quantity will be described below and an example using a luminance histogram is shown here.

The black detection portion 19 sets a fourth threshold Th4 that shows being a black area to this histogram. A pixel of a luminance area not more than the fourth threshold Th4 is treated by being prescribed as a pixel for performing black display (pixel corresponding to black). Accordingly, for example, in the case of 256th tone representation, an area from 0th tone to several tones near 0th tone is able to be prescribed as an area corresponding to black.

Then, the black detection portion 19 counts the number of pixels of the luminance area not more than the fourth threshold Th4, and determines a score of black display (black detection score) according to the count result. The black detection score is determined according to the number of pixels that is counted with a case where all pixels in a frame are included in a black area as Max and with a case where there is no pixel in the black area as 0.

Figure 10:
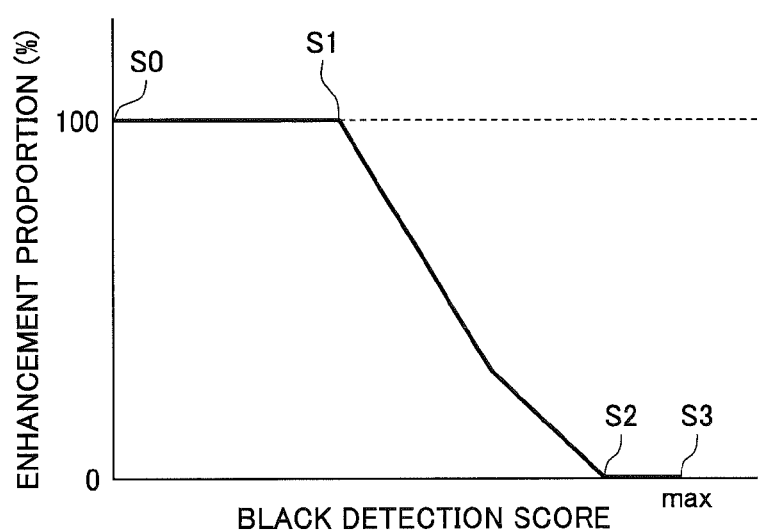
FIG. 10 is a diagram showing exemplary setting of a relation between a black detection score and enhancement proportion.

FIG. 10 is a diagram showing exemplary setting of a relation between a black detection score and enhancement proportion. A relation as shown in FIG. 10 is predefined in the black detection portion 19. Then, in accordance with the black detection score obtained from the histogram of FIG. 9, enhancement proportion is determined. Here, in an area from S0 to S1 having a relatively low black detection score and having less black display, the enhancement proportion is maintained at 100%. That is, since the area of black display is small, there is less influence of black float, and it is not necessary to restrict a luminance enhancement quantity defined according to a light emission quantity, so that the enhancement proportion is set as 100% to focus on feeling of brightness of a bright part by luminance enhancement.

Moreover, in an area from S1 to S2 having a moderate black detection score, the enhancement proportion is reduced according to an increase in the black detection score, that is, an increase in the quantity of black. Since black float is likely to be prominent when black display is increased, the luminance enhancement quantity defined according to a light emission quantity is restricted so as to suppress black float. Then, in an area from S2 to S3 having a high black detection score (score=Max), since there are quite a lot of areas of black display in a screen, the enhancement proportion is set to 0. Thereby, luminance enhancement according to the light emission quantity is eliminated so as to light the backlight with standard luminance.

(Black Detection Processing 2)

Figure 11:
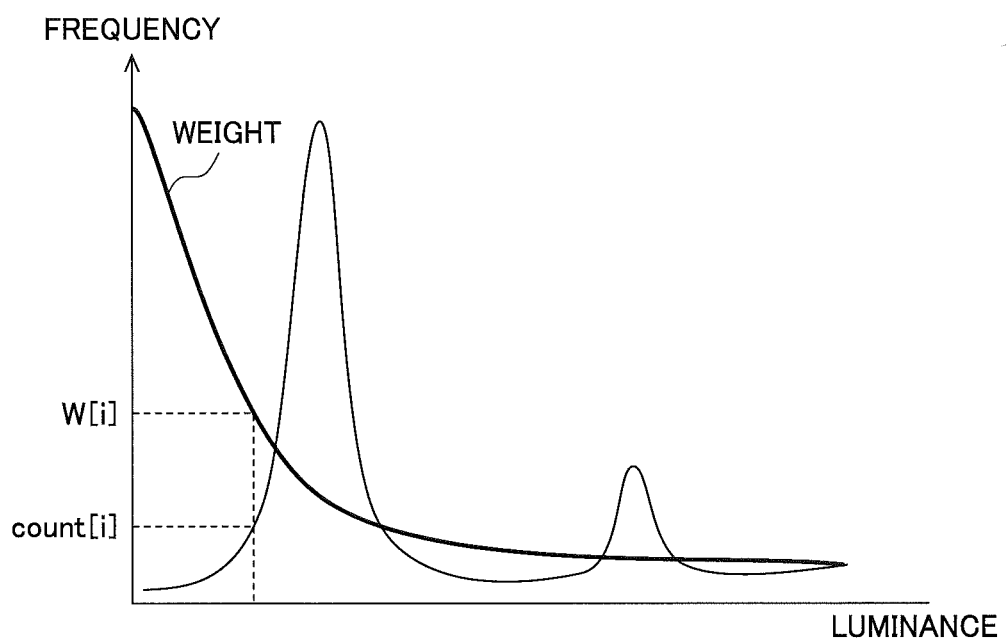
FIG. 11 is a diagram explaining another example of black detection processing in the black detection portion.

FIG. 11 is a diagram explaining another example of black detection processing in the black detection portion. In the processing of the present example, a Y histogram is generated in the same manner as the above-described black detection processing 1, but a histogram by other feature quantity may be used. Moreover, the Y histogram may use any one as long as the histogram generated by the light emission detecting portion 12 is usable.

In addition, the black detection portion 19 detects a quantity of black for each frame from the generated Y histogram, in which a parameter by adding weight to black is set as a black detection score.

Here, the black detection score is calculated by:

$$\text{SCORE(Black Detection Score)} = (\Sigma \text{count}[i] \times W[i]) / \Sigma \text{count}[i] \quad \text{expression (5)}$$

Here, count[i] is a frequency (the number of pixels) of an i-th feature quantity (such as luminance, Max RGB or CMI) of a histogram. Moreover, W[i] is an i-th weight, and a function that defines the weight is able to be set arbitrarily.

FIG. 11 shows exemplary setting of the function W[i] for weighting. Basically, as the feature quantity of the histogram is smaller (as being closer to black), the weight is increased. Then, by multiplying an integrated value of the number of pixels for each feature quantity (luminance tone) by the weight, the black detection score based on the function weighting black is calculated.

A relation between the black detection score and the enhancement proportion is able to be defined as the relation same as FIG. 10 above. That is, in the area from S0 to S1 having a relatively low black detection score and having less black display, the enhancement proportion is set to 100%, and in the area from S1 to S2 having a moderate black detection score, the enhancement proportion is reduced according to an increase in the black detection score, that is, an increase in the quantity of black. Then, in the area from S2 to S3 having a high black detection score (score=Max), since there are quite a lot of areas of black display in a screen, the enhancement proportion is set to 0. Thereby, luminance enhancement according to the light emission quantity is eliminated so as to light the backlight with standard luminance.

(Black Detection Processing 3)

In still another exemplary processing of black detection in the black detection portion 19, a geometric average value GAve (Geometric Average), which is an index of average luminance of a video signal that is coincident with a visual performance of a human, is used. The GAve is not an average of signal luminance but a luminance average value in which an average of luminance of a liquid crystal panel is calculated as a value that is coincident with a visual performance. Specifically, the GAve is expressed by an expression (7) below.

[Formula 1]

$$GeometricAve. = \exp\left(\frac{1}{n}\sum_{pixels}\log(\delta + Y_{lum})\right) \quad (6)$$

In the expression (6) above, $\delta$ is a minute value that prevents log 0. For example, $\delta$ is a value showing minimum luminance that is able to be sensed by a human, and $\delta=0.00001$ is able to be set. Moreover, Ylum shows panel luminance of each pixel, which is a value of 0 to 1.0. Ylum is able to be expressed as (signal luminance/MAX luminance)^$\gamma$. In addition, n and pixels show the total number of pixels. In this manner, the expression (6) is one in which a logarithmic average of a luminance value of a pixel of an image is raised, in other words, shows a value of a geometric mean.

Figure 12:
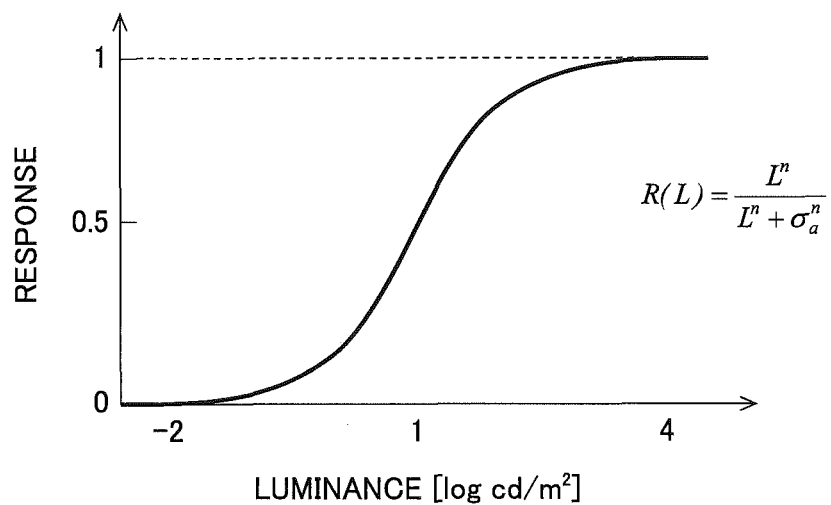
FIG. 12 is a diagram showing a response curve of a human photoreceptor cell with respect to luminance.

FIG. 12 is a diagram showing a response curve of a human photoreceptor cell with respect to luminance. As shown in FIG. 12, the response curve of a human photoreceptor cell depends on a luminance value having a logarithm (luminance (log cd/m)). This is generally referred to as the Mickaelis-Menten Equation.

A GAve is one in which a logarithmic average of a luminance value of a pixel is raised as described above, and therefore the GAve is able to be referred to as a value that response of eyes to an image (that is, how bright it looks) is quantified. That is, it is able to be said that the GAve is close to a human sensory quantity, and this value is used as a feature quantity to determine the enhancement proportion according to the GAve.

In the present example, when an input video signal is input to the black detection portion 19, the GAve is firstly calculated. Here, in accordance with the expression (6) above, processing below is performed to calculate the GAve.

(S1) Normalization is performed for each pixel of a histogram to raise to the $\gamma$-th power, and a panel luminance value is calculated to add a minimum luminance value and the panel luminance value and take a value of log 10 of that value.

(S2) A result of log 10 is added with respect to all pixels.

(S3) An average exp as a result of addition is taken.

Figure 13:
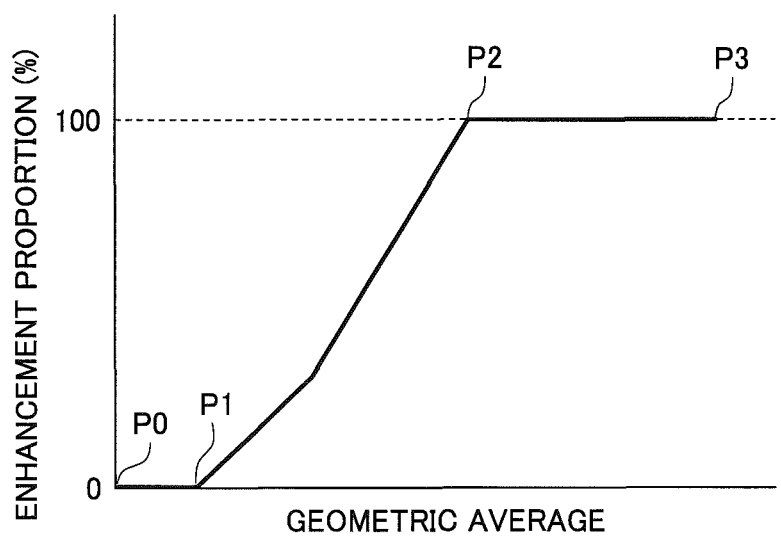
FIG. 13 is a diagram showing exemplary setting of a relation between a geometric average value and enhancement proportion.

FIG. 13 is a diagram showing exemplary setting of a relation between a geometric average value and enhancement proportion. The black detection portion 19 predefines a relation as shown in FIG. 13. Then, the enhancement proportion is determined in accordance with a geometric average value for each frame calculated from an input video signal. Here, in an area from P0 to P1 having a relatively low geometric average value and having less black display, the enhancement proportion is set to 0%. That is, since black float is likely to be prominent when black display is increased, the luminance enhancement quantity that is defined according to the geometric average value close to a human sensory quantity is suppressed to 0% so as to suppress black float.

Moreover, in an area from P1 to P2 having a moderate geometric average value, the enhancement proportion is made higher according to an increase in the geometric average value, that is, a decrease in the quantity of black. Since influence of black float becomes less when black display is reduced, the luminance enhancement quantity proportion is made higher according to an increase in the geometric average. Then, in an area from P2 to P3 having a high geometric average value (geometric average value=Max), since there is very little area of black display in a screen, the enhancement proportion is set to 100% to focus on feeling of brightness of a bright part by luminance enhancement for emphasizing.

(Exemplary Control of Luminance of Backlight Based on Black Detection)

As described above, the area-active-control/luminance-stretching portion 14 inputs the video signal to which tone mapping generated by the mapping portion 13 is applied, and performs area active control based on the video signal to determine Max luminance based on an average lighting rate. At this time, in the area-active-control/luminance-stretching portion 14, a control curve of Max luminance is differentiated according to a result of detecting the quantity of black in the black detection portion 19, and as the quantity of black detection is more, a curve for relation between an average lighting rate and Max luminance is made gradual, thereby suppressing Max luminance. Moreover, at the same time, in the mapping portion 13, according to the result of detecting the quantity of black in the black detection portion 19, the first threshold th1 is shifted to a side having a high feature quantity of luminance or the like to thereby suppress a tone of a dark area much lower by video signal processing to obtain contrast feeling.

Figure 14:
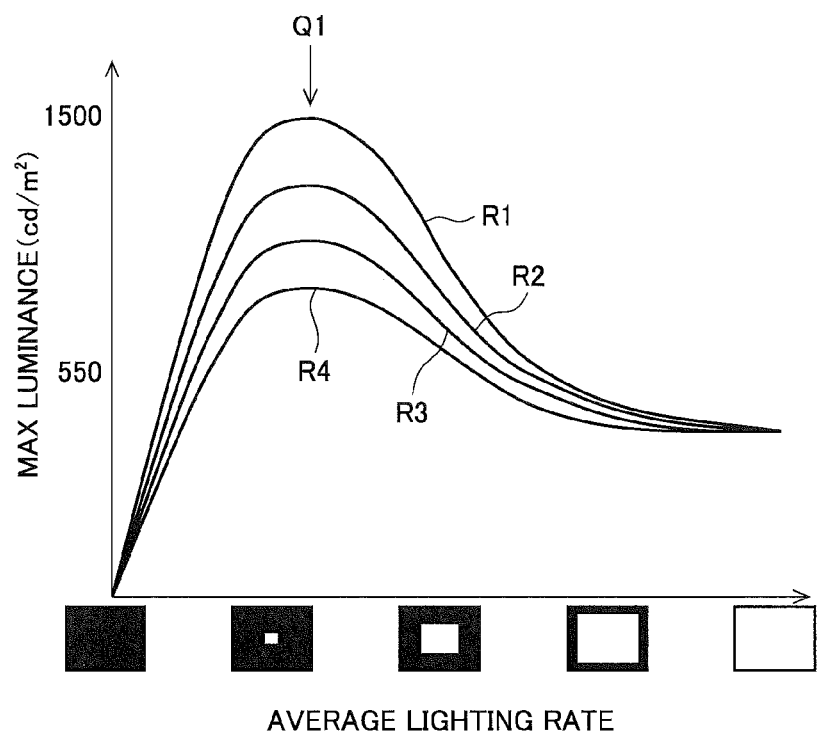
FIG. 14 is a diagram explaining Max luminance that is changed according to a black detection result.

FIG. 14 is a diagram explaining Max luminance that is changed according to a black detection result.

As described above, the area-active-control/luminance-stretching portion 14 calculates an average lighting rate of the entire screen from lighting rates determined according to a maximum tone value of each area. When an area having a high lighting rate increases, the average lighting rate of the entire screen becomes high. Then, a possible maximum value of luminance (Max luminance) is determined with a relation like in FIG. 14.

At this time, according to the result of detecting the quantity of black of a video by the black detection portion 19, setting of Max luminance of FIG. 14 is changed. For example, enhancement proportion according to the black detection score or the geometric average value is output from the black detection portion 19 according to a method for detecting black. An area having high enhancement proportion is an area in which the quantity of black is relatively small. A relation between the enhancement proportion and the control curve of Max luminance is predefined here to change the control curve of Max luminance according to the enhancement proportion output from the black detection portion 19.

For example, as shown in FIG. 14, the control curve of Max luminance is prepared in four steps for controlling with a control curve R1 in the case of a predetermined rage where the enhancement proportion is the highest, and changing control curves R2, R3 and R4 in this order in a stepwise manner as the enhancement proportion is reduced. The control curve R4 is for a case of a dark video having the lowest enhancement proportion (having a high black detection score or having a high geometric average value). Thereby, in the case of a video which has a lot of black areas so that the black detection score and the geometric average value become high, luminance stretching of the backlight is suppressed so as to prevent degrading quality due to black float.

Note that, though the control curve is set in four steps in the example of FIG. 14, it is possible to control in a plurality of steps of two or more steps without limitation to four steps. In addition, a control curve may be generated for each time so as to change in a stepless manner according to the enhancement proportion.

Figure 15:
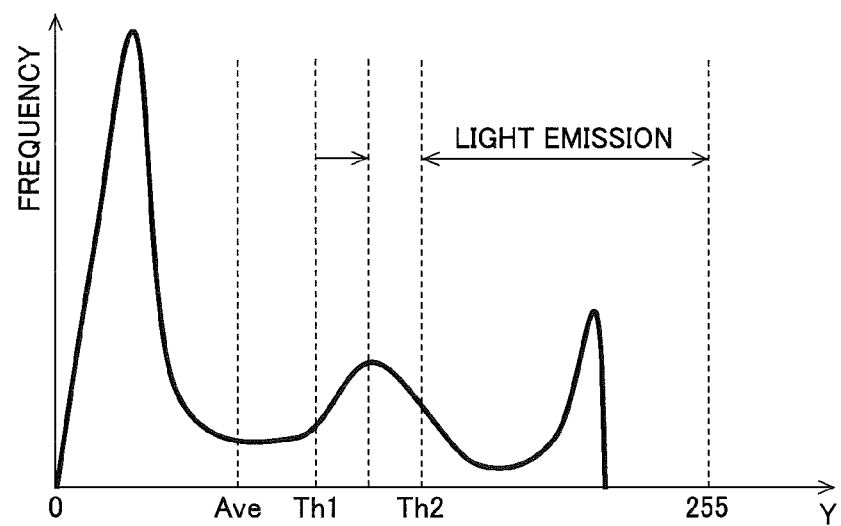
FIG. 15 is a diagram explaining a first threshold that is changed according to a result of detecting a quantity of black.

FIG. 15 is a diagram explaining the first threshold that is changed according to a result of detecting a quantity of black. As described above, the light emission detecting portion 12 integrates the number of pixels for each luminance tone to generate a Y histogram for each frame of an input video signal. Then, an average value (Ave) and a standard deviation (σ) are calculated from the Y histogram, and the second threshold Th2 that defines a light emitting boundary and the first threshold Th1 for suppressing incongruity in tones of an area smaller than Th2 and the like (Th1=Ave+Mσ) are set.

At this time, a position of the first threshold Th1 of FIG. 15 is changed according to the result of detecting the quantity of black of a video by the black detection portion 19. For example, enhancement proportion in accordance with a black detection score or a geometric average value is output according to a method for detecting black from the black detection portion 19. An area having high enhancement proportion is an area whose quantity of black is relatively small. Here, a relation between the enhancement proportion and the position of the first threshold Th1 is predefined to change the position of the first threshold Th1 according to the enhancement proportion output from the black detection portion 19. Specifically, a value of "M" in Th1=Ave+Mσ is changed to change the position of Th1 in a luminance direction of the histogram. At this time, the position of the first threshold Th1 may be set in advance in a plurality of steps according to the enhancement proportion, or the position of the first threshold Th1 may be set so as to change in a stepless manner according to the enhancement proportion.

For example, as shown in FIG. 15, as the enhancement proportion becomes lower, the value of M is increased and the first threshold Th1 is shifted to a high-luminance side. Thereby, the position of the first threshold Th1 is shifted to the high-luminance side in the case of a video which has a lot of black areas so that the black detection score and the geometric average value become high.

Figure 16:
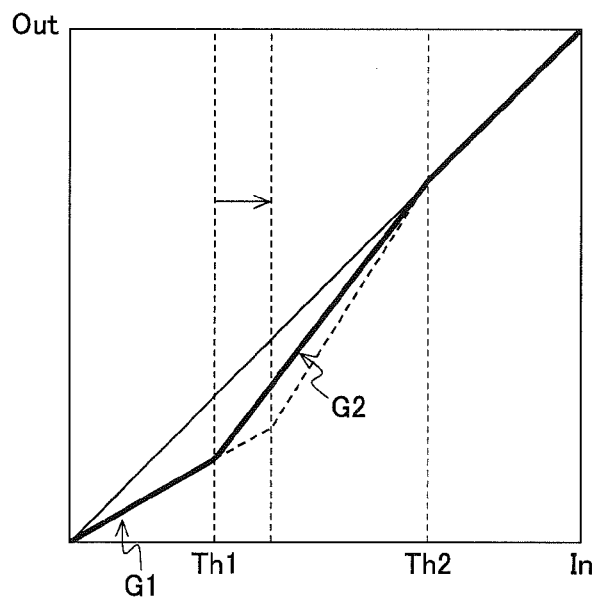
FIG. 16 is a diagram explaining an example of tone mapping according to black detection.

FIG. 16 is a diagram explaining an example of tone mapping according to black detection. As described above, the mapping portion 13 sets a first gain G4 to an area smaller than the first threshold Th1 and sets a second gain G5 so as to linearly connect between Th1 and Th2 to perform tone mapping. At this time, the tone mapping is performed in accordance with the position of the first threshold Th1 that is determined according to the result of detecting the quantity of black of a video by the black detection portion 19. In this case, as shown in FIG. 16, as the enhancement proportion becomes lower with black areas increased, the first threshold Th1 shifts to the high-luminance side, so that a tone in a low-luminance area is suppressed low in a wider range, thus enabling image quality focusing on contrast feeling more.

As another exemplary setting of Max luminance and the first threshold, Max luminance and the position of the first threshold Th1 may be set according to not the enhancement proportion output from the black detection portion 19 as described above, but a quantity of the black detection score detected by the black detection portion 19 or the geometric average value. Since the black detection score and the geometric average value serve as one index which represents degree of black areas of a video as they are, it is possible to perform control according to these values so as to prevent black float by suppressing Max luminance as well as to focus on contrast feeling by shifting the first threshold Th1 to the high-luminance side, for example, as the quantity of black is increased.

Figure 17:
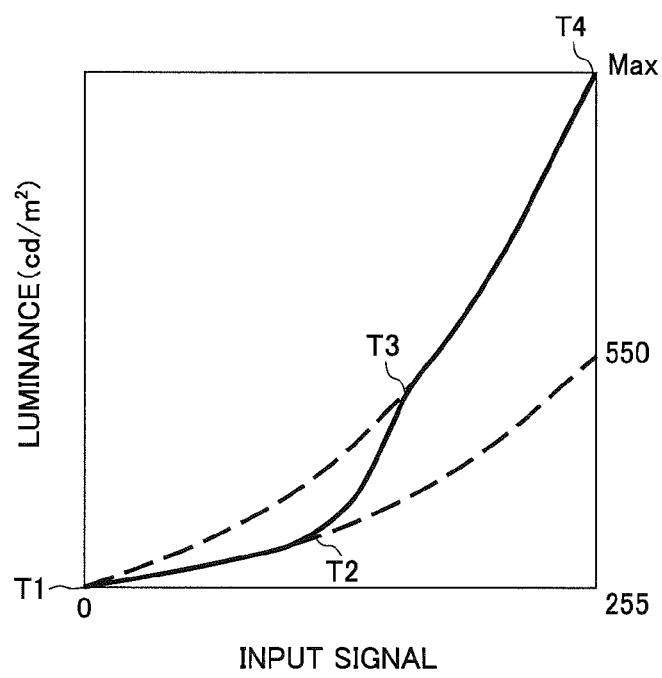
FIG. 17 is a diagram showing a state where screen luminance is enhanced by processing of the area-active-control/luminance-stretching portion 14.

FIG. 17 is a diagram showing a state where screen luminance is enhanced by processing of the area-active-control/luminance-stretching portion 14. A horizontal axis is a tone value of an input video signal and a vertical axis is screen luminance (cd/m$^2$) of the display portion 18.

T2 and T3 correspond to positions of tone values of the first and second thresholds Th1 and Th2 used in the light emission detecting portion 12, respectively. In an area not less than the second threshold Th2 detected by the light emission detecting portion 12 as described above, signal processing for reducing an output tone of a video signal according to a luminance stretch quantity of the backlight is not performed. As a result of this, the input video signal is displayed by being enhanced with a γ curve according to Max luminance determined by area active control from T3 to T4. For example, in a case where Max luminance is 1500 (cd/m$^2$), when the input video signal has a maximum tone value (255), screen luminance is 1500 (cd/m$^2$). The Max luminance in this case is Max luminance that is determined according to an average lighting rate determined based on the video signal and a result of detecting the quantity of black by black detection processing.

On the other hand, in the case of an input tone value from T1 to T2, as described above, the first gain G1 is applied to the video signal so as to reduce an increment of screen luminance by luminance stretching of the backlight, so that the screen is displayed with the γ curve based on reference luminance. This is because an output value of the video signal is suppressed in a range smaller than the threshold Th1 (corresponding to T2) in response to a quantity of luminance stretching in the mapping portion 13 in accordance with Max luminance determined by the area-active-control/luminance-stretching portion 14. T2 to T3 has screen luminance shifted according to tone mapping of Th2 to Th1.

As Max luminance increases, there is a larger difference in a screen luminance direction between a curve based on reference luminance from T1 to T2 and a curve based on Max luminance from T3 to T4. As described above, the curve based on the reference luminance is a γ curve in which screen luminance of a maximum tone value becomes reference luminance when backlight luminance is not stretched (as an example, screen luminance of a maximum tone value is 550 cd/m$^2$), and the curve based on Max luminance is a γ curve in which screen luminance of a maximum tone value becomes Max luminance determined by the area-active-control/luminance-stretching portion 14.

In this manner, screen luminance is controlled with the reference luminance while the input video signal is from 0 tone (T1) to T2. In the case of a dark video with a low tone, when being displayed with increased luminance, deterioration of quality such as reduction of contrast and black float is caused, so that luminance is suppressed by video signal processing only by a quantity of luminance stretching of the backlight so as not to increase the screen luminance.

Further, since a range where the input video signal is at T3 or more is a range that is regarded as emitting light, the video signal is maintained without being suppressed in a state where the backlight is stretched by luminance stretching. Thereby, the screen luminance is enhanced to allow display of a high-definition image having more feeling of brightness.

In this case, when the black detection quantity by the black detection portion 19 is increased and Max luminance is suppressed, a difference in the screen luminance direction between the curve based on reference luminance from T1 to T2 and the curve based on Max luminance from T3 to T4 becomes small. That is, as Max luminance that is determined according to the quantity of black detected by the black detection portion becomes small, the curve from T3 to T4 shifts to a low-luminance side. Moreover, since a position of T2 corresponds to the position of the first threshold Th1 that changes according to the black detection quantity, when the black detection quantity increases, the position of T2 also shifts to a high-tone side of the input signal, resulting in display with contrast feeling focused on. Note that, the γ curve from T1 to T2 does not need to conform to the reference luminance, and is able to be set by appropriately adjusting the gain G4, as long as having a level of giving a difference from an enhanced area of a light emitting part.

Embodiment 2

Figure 18:
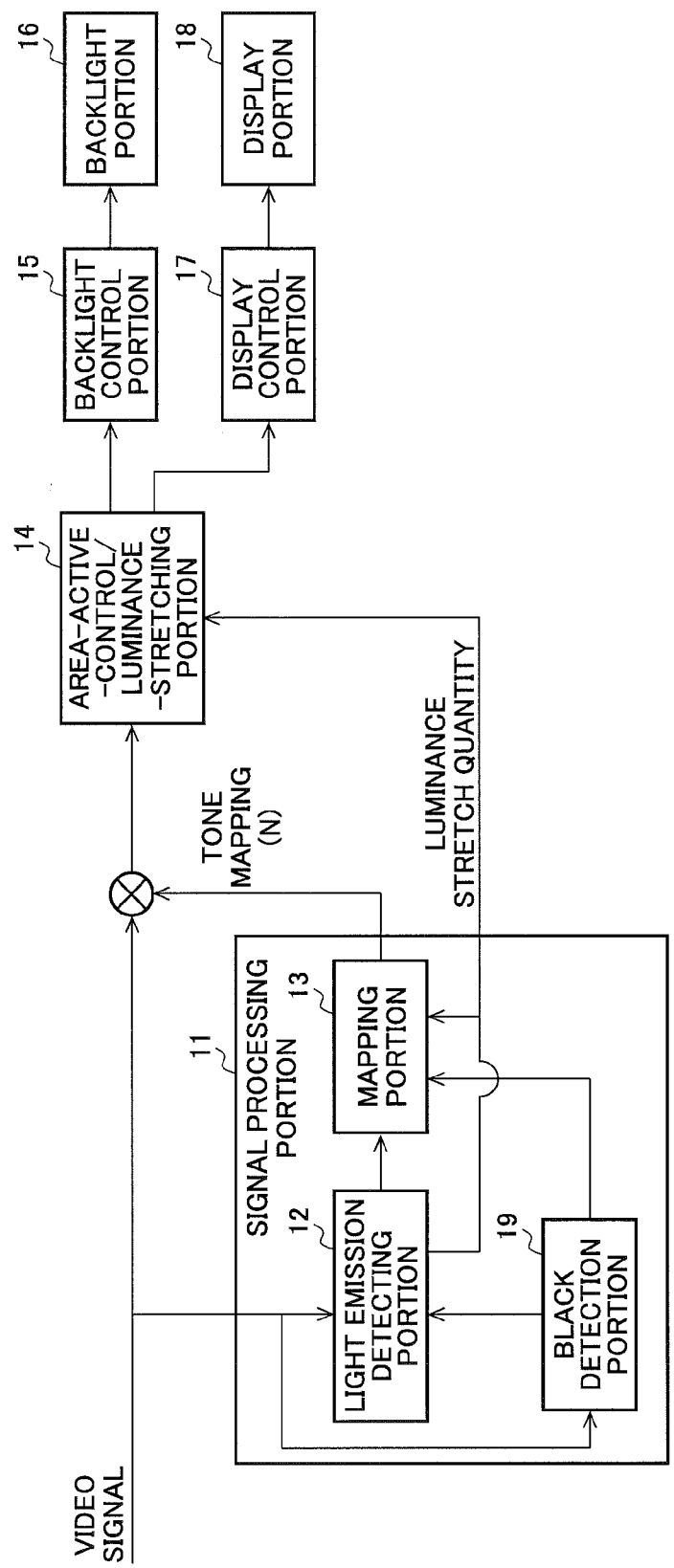
FIG. 18 is a diagram explaining another embodiment of the video display device according to the present invention.

FIG. 18 is a diagram explaining another embodiment of the video display device according to the present invention.

A second embodiment has the same configuration as the first embodiment, but, differently from the first embodiment, determines a luminance stretch quantity based on a detection result of the light emission detecting portion 12 and the black detection portion 19 to execute tone mapping based on the determined luminance stretch quantity, without determining a value of Max luminance, which is used when performing tone mapping, by the area-active-control/luminance-stretching portion 14. Accordingly, the mapping portion 13 of the signal processing portion 11 does not need to cause the area-active-control/luminance-stretching portion 14 to output a value of Max luminance by luminance stretching like the embodiment 1.

The black detection portion 19 detects a quantity corresponding to black display from an input video signal in accordance with a predefined condition. In the present embodiment, any one of the black detection processing 1 to 3 described in the embodiment 1 is able to be applied as black detection processing performed by the black detection portion 19. With this black detection processing, enhancement proportion according to the black detection score or the geometric average value is output from the black detection portion 19. An area having high enhancement proportion is an area in which the quantity of black is relatively small. The detection result by the black detection portion 19 is input to the light emission detecting portion 12 and the mapping portion 13.

Figure 19:
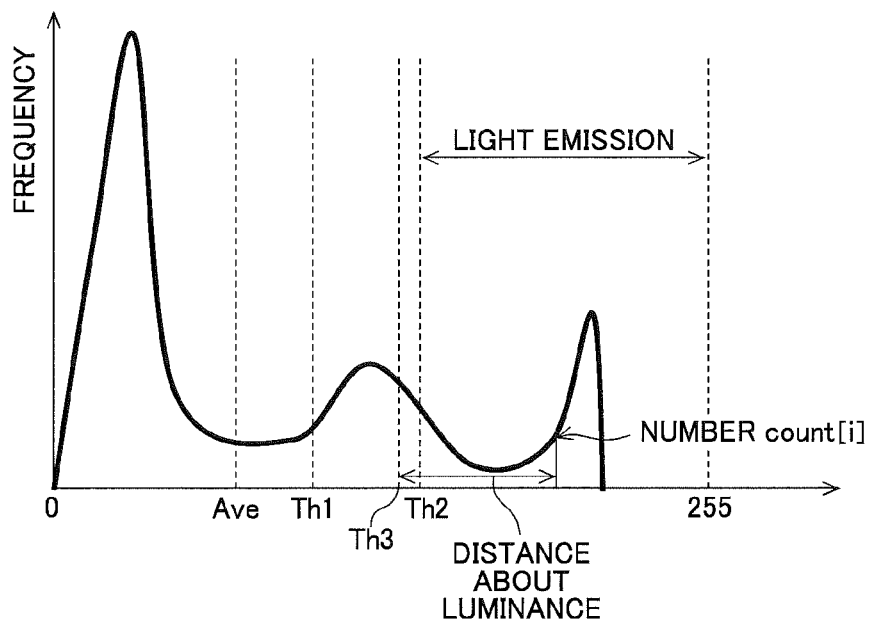
FIG. 19 shows an example of a Y histogram generated from a luminance signal Y of an input video signal.

FIG. 19 shows an example of a Y histogram generated from a luminance signal Y of an input video signal. In the same manner as the embodiment 1, the light emission detecting portion 12 integrates the number of pixels for each luminance tone of pixels to generate a Y histogram for each frame of an input video signal, by using luminance as a feature quantity of a video. Then, an average value (Ave) and a standard deviation (σ) are calculated from the Y histogram, and two thresholds Th1 and Th2 are calculated by using them. In the same manner as the embodiment 1, the second threshold Th2 defines a light emitting boundary and a pixel not less than this threshold Th2 is regarded as a part that emits light in the Y histogram. As the feature quantity of a video, other feature quantity described below is able to be used, but luminance is set to be used here.

In the present embodiment, in addition to the first threshold Th1 and the second threshold Th2 of the embodiment 1, a third threshold Th3 is further set. The third threshold Th3 exists between Th1 and Th2 and is provided to detect a state of a pixel of a light emitting part.

The threshold Th3 may have the same value as Th2, but is provided having a large margin for a light emitting part having Th2 or more in order to facilitate processing.

Therefore, given is $$Th3 = Ave + Q\sigma (M < Q \le N) \quad \text{expression (7)}$$

Figure 20:
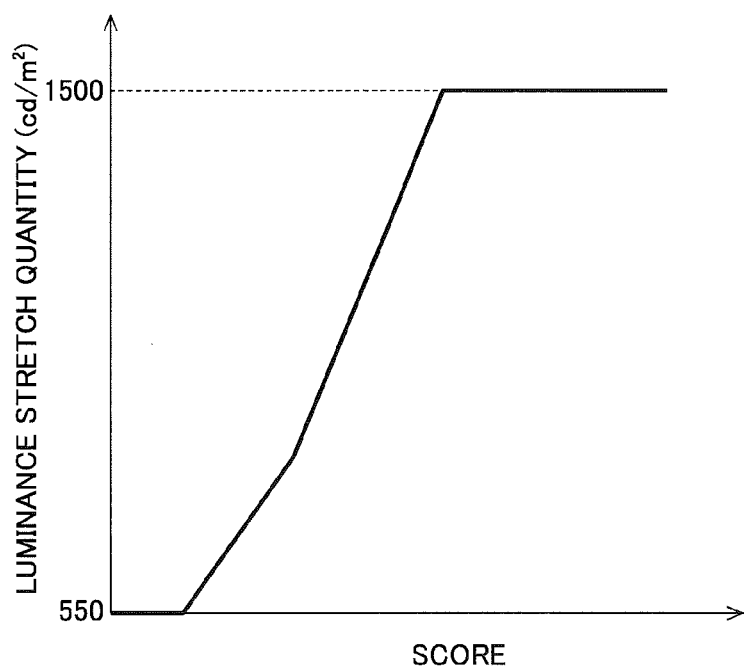
FIG. 20 is a diagram showing exemplary calculation of a luminance stretch quantity according to a pixel not less than a third threshold Th3.

FIG. 20 is a diagram showing exemplary calculation of a luminance stretch quantity according to a pixel not less than a third threshold Th3. A horizontal axis indicates a score of a pixel value not less than the third threshold Th3, and a vertical axis indicates a luminance stretch quantity according to the score. The score corresponds to an example of an index associated with brightness according to the present invention.

The score shows a degree of brightness by being defined as [proportion of a pixel not less than a certain threshold]× [distance from the threshold (difference of luminance)] for counting the number of pixels of a pixel having a tone value larger than the third threshold Th3 to calculate a weighted distance from the threshold Th3, and, for example, is calculated by an expression (8) below:

[Formula 2]

$$\text{Score} = 1000 \times \sum_{i > Th3} \{(\text{count}[i] \times (i^2 - (Th3)^2) / (\text{Total Number of Pixels} \times (Th3)^2)\} \quad (5)$$

In the expression (8), count [i] is a count of the number of pixels with respect to a tone value i. Further, $i^2 - (Thresh3)^2$ indicates a distance as to luminance (difference of luminance) as shown in FIG. 19, and may adopt a distance from a threshold in lightness L* instead. Note that, this square represents luminance, which is actually 2.2th power. That is, when a value of a digital code is i, the luminance becomes $i^{2.2}$. At this time, the lightness L* becomes $(i^{2.2})^{1/3} \approx i$. As a result of verification with an actual video display device, a difference from a threshold in the luminance is more effective than a difference from a threshold in the lightness and the like. Further, in the expression (8), the total number of pixels indicates a value obtained by counting the number of all pixels regardless of i>Th3. If such a calculation value is adopted as the score, when there are a lot of high-tone pixels away from Th3 in a light emitting part, the score becomes high. Furthermore, even when the number of pixels not less than Th3 is fixed, the score becomes higher when there are a lot of high-tone pixels.

Then, in the case of having a score in a certain level or higher, a luminance stretch quantity is set high to increase feeling of brightness by stretching a brilliant video having a high tone so as to have much higher luminance. In this example, in a part having a certain level or higher score, possible maximum screen luminance reached after luminance stretching is set to 1500 (cd/m²). Moreover, when the score is low, it is set so that a luminance stretch quantity becomes small as the score becomes small. Furthermore, the light emission detecting portion 12 changes a control curve shown in FIG. 21 according to the result of detecting the quantity of black in the black detection portion 19. This luminance stretch quantity has the same concept as Max luminance of the first embodiment and is indicated by, for example, a value of backlight duty.

Figure 21:
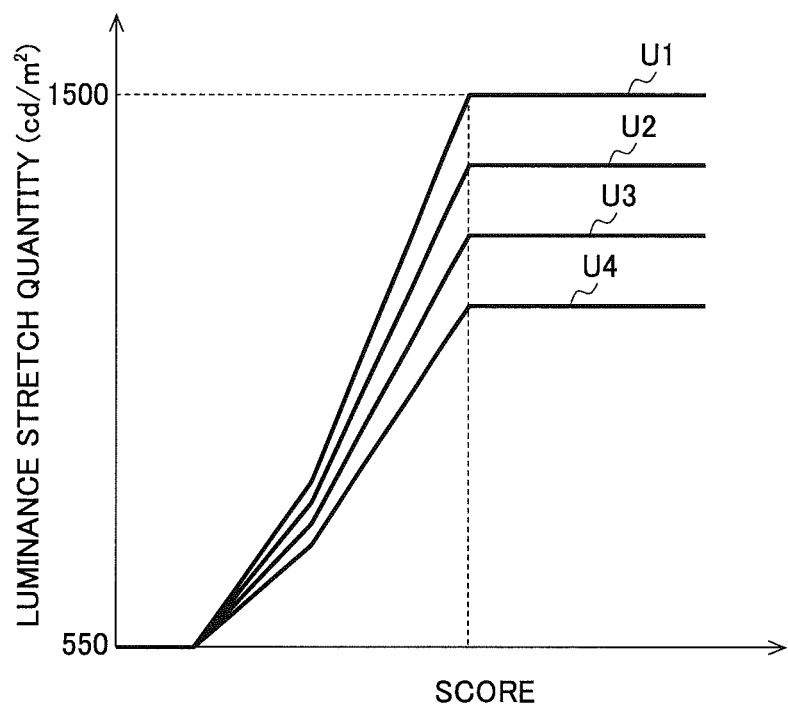
FIG. 21 is a diagram explaining exemplary setting of a control curve of a luminance stretch quantity that is changed according to a black detection result.

FIG. 21 is a diagram explaining exemplary setting of a control curve of a luminance stretch quantity that is changed according to a black detection result. The light emission detecting portion 12 determines a luminance stretch quantity according to a score of a pixel value not less than the threshold Th3 as described above, and changes a control curve that defines a relation between the score and the luminance stretch quantity at this time according to the detection result output from the black detection portion 19. Specifically, a relation between the enhancement proportion that is output from the black detection portion 19 as the detection result and the control curve is predefined to change the control curve according to the enhancement proportion output from the black detection portion 19.

For example, as shown in FIG. 21, a control curve of luminance stretching is prepared in four steps for controlling with a control curve U1 in the case of a predetermined rage where the enhancement proportion is the highest, and changing control curves U2, U3 and U4 in this order in a stepwise manner as the enhancement proportion is reduced. The control curve U4 is for a case of a dark video having the lowest enhancement proportion (having a high black detection score or having a high geometric average value). Thereby, in the case of a video which has a lot of black areas so that the black detection score and the geometric average value become high, luminance stretching of the backlight is suppressed so as to prevent degrading quality due to black float.

Note that, though the control curve is set in four steps in the example of FIG. 21, it is possible to control in a plurality of steps of two or more steps without limitation to four steps. In addition, a control curve may be generated for each time so as to change in a stepless manner according to the enhancement proportion.

Next, the light emission detecting portion 12 changes the position of the first threshold Th1 in the Y histogram according to the detection result of the black detection portion 19 through the same processing as the embodiment 1. For example, as described in the embodiment 1, in the histogram of FIG. 15, as the enhancement proportion by black detection is reduced, the first threshold Th1 is shifted to the high-luminance side. Thereby, in the case of a video which has a lot of black areas so that the black detection score and the geometric average value become high, the position of the first threshold Th1 is shifted to the high-luminance side.

As another exemplary setting of the luminance stretch quantity and the first threshold, the luminance stretch quantity and the position of the first threshold Th1 may be set according to not the enhancement proportion output from the black detection portion 19 as described above, but a quantity of the black detection score detected by the black detection portion 19 or the geometric average value. Since the black detection score and the geometric average value serve as one index which represents degree of black areas of a video as they are, it is possible to perform control according to these values so as to prevent black float by suppressing the luminance stretch quantity as well as to focus on contrast feeling by shifting the first threshold Th1 to the high-luminance side, for example, as the quantity of black is increased.

The values of the first and second thresholds Th1 and Th2 output from the light emission detecting portion 12, and the luminance stretch quantity determined in accordance with a score of a pixel not less than Th3 are output to the mapping portion 13 and used to generate tone mapping.

Processing of tone mapping at the mapping portion 13 is the same as the first embodiment. That is, as shown in FIG. 15, the first gain G4 is set to an area smaller than the first threshold Th1 set by the light emission detecting portion 12, and the second gain G5 is set so as to linearly connect between Th1 and Th2. At this time, when setting the gain G4, the luminance stretch quantity determined according to the result of detecting the quantity of black by the light emission detecting portion 12 is used to reduce luminance by video signal processing according to the luminance stretch quantity of the backlight. The obtained tone mapping is applied to the input video signal and input to the area-active-control/luminance-stretching portion 14.

The processing in the area-active-control/luminance-stretching portion 14 is the same as the embodiment 1. However, the area-active-control/luminance-stretching portion 14 does not need to determine Max luminance from an average lighting rate of the backlight to be output to the signal processing portion 11 like the embodiment 1, and to the contrary, stretches luminance of an LED of the backlight portion 16 based on the luminance stretch quantity output from the light emission detecting portion 12 of the signal processing portion 11.

That is, the area-active-control/luminance-stretching portion 14 divides a video into a predetermined plurality of areas to extract a maximum tone value of a video signal for each of the divided areas, and determines a lighting rate of an LED for each area according to the extracted maximum tone value. For example, for a dark area with a low maximum tone value, the lighting rate is decreased to reduce luminance of the backlight. Then, electricity powered to the entire backlight is increased according to the luminance stretch quantity output from the light emission detecting portion 12 in this state to entirely up luminance of the backlight. Thereby, a bright video that emits light becomes brighter and feeling of brightness is increased. Moreover, in a non-light emitting part, luminance corresponding to luminance stretching is reduced by video signal processing, resulting that only a light emitting part on a screen has higher luminance, so that a high-definition video with high contrast is able to be displayed. The relation between an input video signal and screen luminance is the same as FIG. 17 shown in the first embodiment.

Embodiment 3

Figure 22:
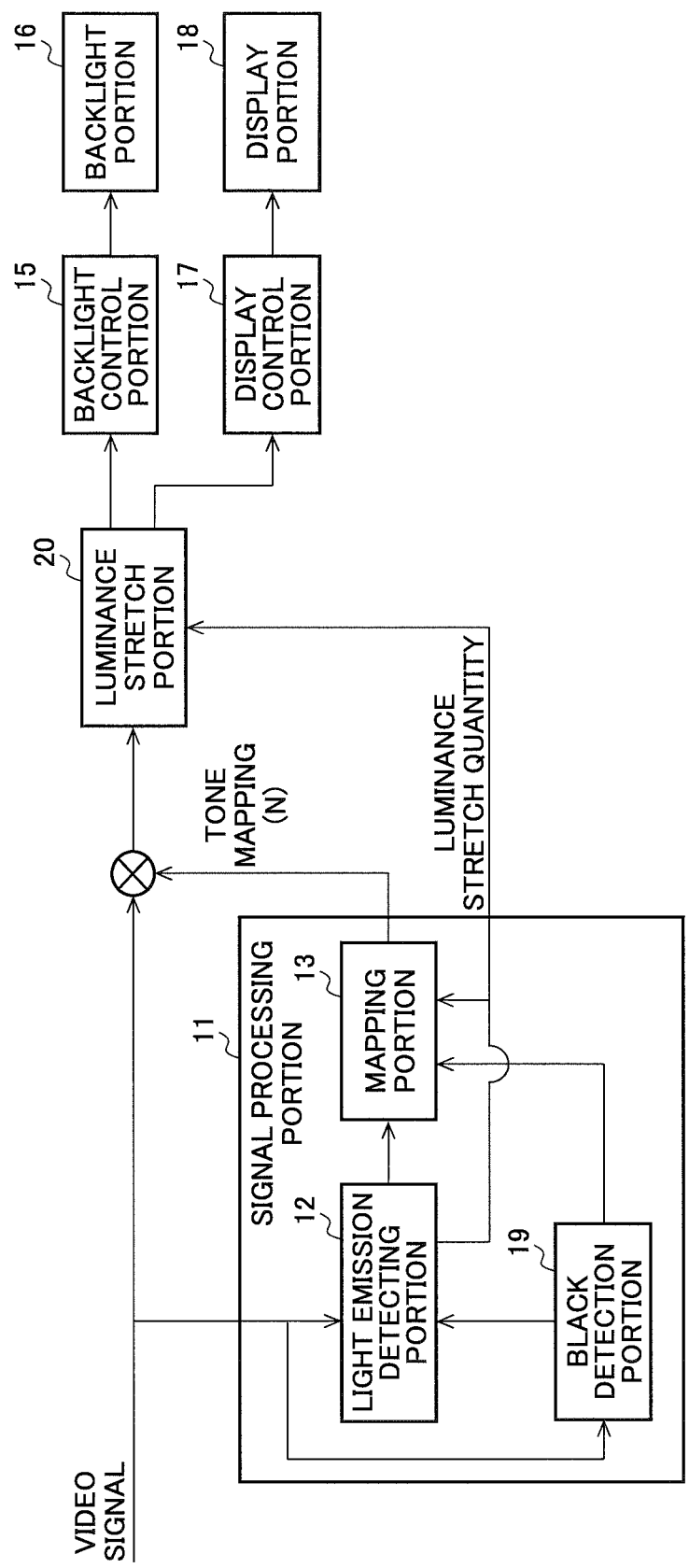
FIG. 22 is a diagram explaining still another embodiment of the video display device according to the present invention.

FIG. 22 is a diagram explaining still another embodiment of the video display device according to the present invention.

A third embodiment has the same configuration as the second embodiment for performing the same operation as the second embodiment, but, differently from the second embodiment, a luminance-stretching portion 20 stretches luminance of the backlight portion 16 based on a luminance stretch quantity output from the light emission detecting portion 12 of the signal processing portion 11 without performing area active control.

That is, the luminance-stretching portion 20 inputs a video signal to which tone mapping generated by the mapping portion 13 is applied to output control data displaying the video signal to the display control portion 17. At this time, processing by area active control is not performed. On the other hand, the entire backlight portion 16 is uniformly stretched based on the luminance stretch quantity output from the light emission detecting portion 12.

Thereby, a bright video that emits light becomes brighter and feeling of brightness is increased. Moreover, in a non-light emitting part, luminance corresponding to luminance stretching is reduced by video signal processing, resulting that luminance becomes high in a light emitting part on a screen, so that a high-definition video with high contrast is able to be displayed.

Operation for other components in the third embodiment is the same as the second embodiment, so that repetitive description will be omitted.

(Other Feature Quantity)

In the above-described respective examples, the luminance Y is used as a feature quantity of a video in processing for detecting a light emitting part by the light emission detecting portion 12 and black detection processing (black detection processing 1 and 2) by the black detection portion 19, and a luminance histogram is generated to detect a light emitting part and the quantity of black therefrom. As the feature quantity for generating the histogram, in addition to luminance, for example, a CMI (Color Mode Index) or Max RGB is able to be used.

The CMI is an index showing how bright a focused color is. Here, differently from luminance, the CMI shows brightness to which color information is also added. The CMI is defined by:

$$L^*/L^*\text{modeboundary} \times 100 \qquad \text{expression (9)}$$

The above-described $L^*$ is an index of relative brightness of a color, and the case of $L^*=100$ provides lightness of the brightest white as an object color. In the above-described expression (9), $L^*$ is lightness of a focused color, and $L^*$modeboundary is a lightness of a boundary appearing like emitting light with the same chromaticity as the focused color. Here, it is found that lightness is provided as $L^*$modeboundary≈optimal color (brightest color of object colors). Lightness of a color provided as CMI=100 is referred to as a light emitting color boundary, and defined that light is emitted when exceeding CMI=100.

Figure 23:
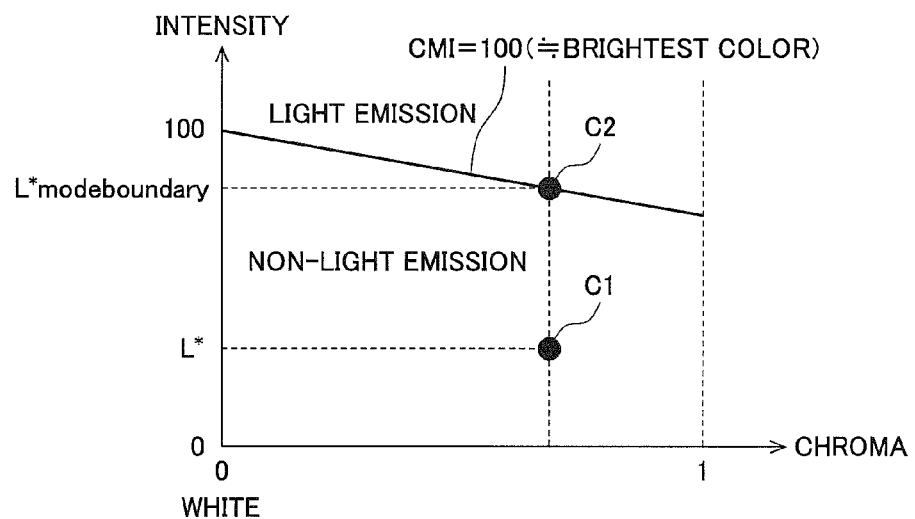
FIG. 23 is a diagram explaining a method for calculating a CMI from a broadcast video signal to be displayed on the video display device.

A method for calculating the CMI from a broadcast video signal to be displayed on the video display device will be described with reference to FIG. 23. A broadcast video signal is standardized to be transmitted based on the BT.709 standard. Therefore, first, RGB data of the broadcast video signal is converted into data of a tristimulus value XYZ using a conversion matrix for the BT.709. Then, the lightness $L^*$ is calculated using a conversion equation from Y. It is set that $L^*$ of the focused color is at a position C1 of FIG. 24. Chromaticity is then calculated from the converted XYZ to examine $L^*$ of an optimal color with the same chromaticity as the focused color ($L^*$modeboundary) from known data of the optimal color. The position on FIG. 23 is C2.

From these values, the CMI is calculated using the above-described expression (9). The CMI is shown by a ratio of $L^*$ of a focused pixel to $L^*$ of an optimal color with the chromaticity thereof ($L^*$modeboudary).

The CMI is obtained by the above-described method for each pixel of a video signal. With the standardized broadcast signal, all pixels take any one of the CMIs falling within a range 0 to 100. Then, for one frame of a video, a CMI histogram is created with a horizontal axis as a CMI and a vertical axis as frequency. Here, the average value Ave. and the standard deviation σ are calculated to set each threshold for detecting a light emitting part.

Further, in another example, a feature quantity is data having a maximum tone value of RGB data (Max RGB). Having two colors with the same chromaticity in a combination of RGB means the same as that a ratio of RGB is not changed. That is, processing for operating an optimal color with the same chromaticity in the CMI is processing for obtaining a combination of RGB having the largest tone of RGB data when the ratio of RGB data is not changed to be multiplied by a fixed number.

Figure 24:
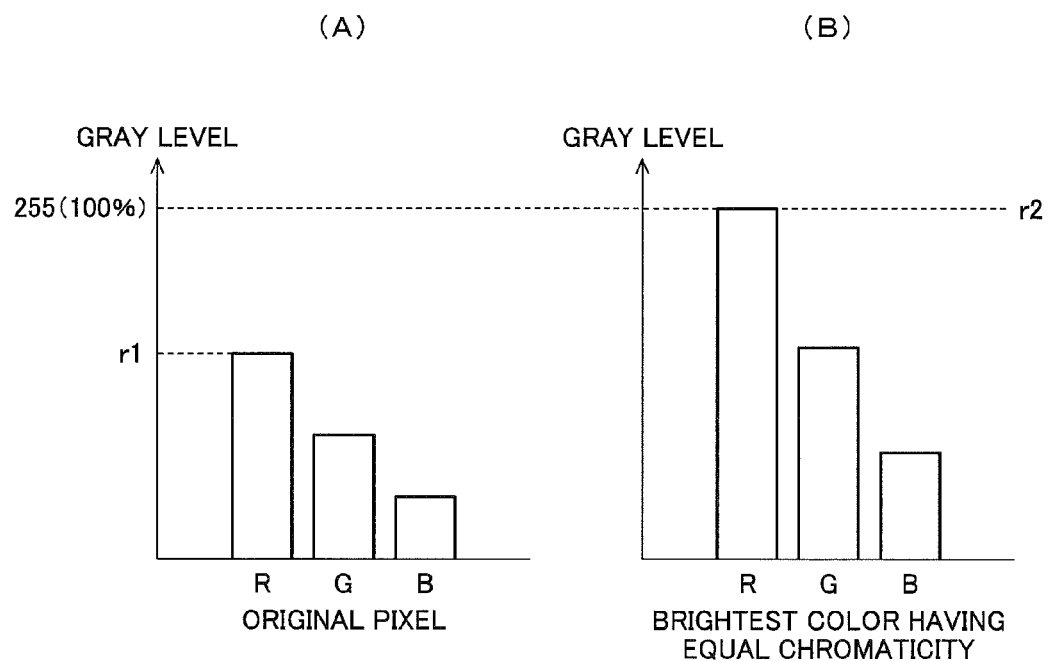
FIG. 24 is a diagram explaining a maximum tone value of RGB used as a feature quantity.

For example, it is set that a pixel having RGB data with a tone as shown in FIG. 24(A) is a focused pixel. When RGB data of the focused pixel is multiplied by a fixed number, a color when any of RGB is first saturated is the brightest color with the same chromaticity as an original pixel, as shown in FIG. 24 (B). Then, when a tone of the focused pixel of the color which is first saturated (in this case, R) is r1, and a tone of R of an optimal color is r2, the value similar to the CMI is able to be obtained by:

$$r1/r2 \times 100 \qquad \text{expression (10)}$$

The color which is first saturated when RGB is multiplied by a fixed number is a color having a maximum tone of RGB of the focused pixel.

The value by the above-described expression (10) is then calculated to create a histogram for each pixel. The average value Ave. and the standard deviation σ are calculated from this histogram to set each threshold so that a light emitting part is able to be detected or a quantity of black is able to be detected. The histogram at this time may be one for integrating the maximum tone values of RGB of pixels without being converted into values of 0 to 100 in accordance with the expression (10).

EXPLANATIONS OF LETTERS OR NUMERALS

11 . . . signal processing portion, 12 . . . light emission detecting portion, 13 . . . mapping portion, 14 . . . area-active-control/luminance-stretching portion, 15 . . . backlight control portion, 16 . . . backlight portion, 17 . . . display control portion, 18 . . . display portion, 19 . . . black detection portion, and 20 . . . luminance-stretching portion.

The invention claimed is:

1. A television receiving device including a video display device, the video display device comprising:
   a display portion for displaying an input video signal; a light source for illuminating the display portion; and a control portion for controlling the display portion and the light source, wherein
   the control portion stretches and increases luminance of the light source based on control curves that define a relation between an index associated with brightness calculated based on a predetermined condition from the input video signal and a luminance stretch quantity for stretching the luminance of the light source, and
   detects a light emitting part that is regarded as a video emitting light based on a predetermined feature quantity of the input video signal and reducing luminance of a video signal of a non-light emitting part excluding the light emitting part, to thereby enhance display luminance of the light emitting part, wherein
   the video display device has a black detection portion detecting a quantity of black display based on a predetermined condition for black detection from the input video signal, and
   the control portion switches the control curves according to the quantity of black display detected by the black detection portion,
   wherein
   the control portion divides an image by the input video signal into a plurality of areas, and changes a corresponding lighting rate of the light source for each of the areas based on a tone value of a video signal of the divided area,
   the control curve is a control curve that defines a relation between an average lighting rate obtained by averaging the lighting rates corresponding to all areas and a luminance stretch quantity shown by possible maximum luminance on a screen of the display portion, and
   the control portion uses the average lighting rate as the index associated with the brightness to stretch the luminance of the light source based on the maximum luminance defined in accordance with the average lighting rate.

2. A television receiving device including a video display device, the video display device comprising:
a display portion for displaying an input video signal; a light source for illuminating the display portion; and a control portion for controlling the display portion and the light source, wherein
the control portion stretches and increases luminance of the light source based on control curves that define a relation between an index associated with brightness calculated based on a predetermined condition from the input video signal and a luminance stretch quantity for stretching the luminance of the light source, and
detects a light emitting part that is regarded as a video emitting light base on a predetermined feature quantity of the input video signal and reducing luminance of a video signal of a non-light emitting part excluding the light emitting part, to thereby enhance display luminance of the light emitting part, wherein
the video display device has a black detection portion for detecting a quantity of black display based on a predetermined condition for black detection from the input video signal, and
the control portion switches the control curves according to the quantity of black display detected by the black detection portion,
wherein
the control curve is a control curve in which the luminance stretch quantity becomes smaller as the quantity of black display detected by the black detection portion is increased.

3. A television receiving device including a video display device, the video display device comprising:
a display portion for displaying an input video signal; a light source for illuminating the display portion; and a control portion for controlling the display portion and the light source, wherein
the control portion stretches and increases luminance of the light source based on control curves that define a relation between an index associated with brightness calculated based on a predetermined condition from the input video signal and a luminance stretch quantity for stretching the luminance of the light source, and
detects a light emitting part that is regarded as a video emitting light based on a predetermined feature quantity of the input video signal and reducing luminance of a video signal of a non-light emitting part excluding the light emitting part, to thereby enhance display luminance of the light emitting part, wherein
the video display device has a black detection portion for detecting a quantity of black display based on a predetermined condition for black detection from the input video signal, and
the control portion switches the control curves according to the quantity of black display detected by the black detection portion,
wherein
the control curve is a control curve that defines a relation between a score obtained by counting the number of pixels by weighting brightness of each pixel and the luminance stretch quantity with respect to a video in a predetermined range including an area of the detected light emitting part, and
the control portion uses the score as the index associated with the brightness to stretch the luminance of the light source based on the score that is calculated from the input video signal.

4. The television receiving device as defined in claim 3, wherein
the control curve is a control curve in which the luminance stretch quantity becomes smaller as the quantity of black display detected by the black detection portion is increased.

5. The television receiving device as defined in claim 1, wherein
the control portion performs video processing for converting and outputting an input tone of the input video signal,
input/output characteristics that define a relation between the input tone and an output tone have a threshold that is defined in an area of a non-light emitting part having a lower tone than a boundary of the light emitting part and the non-light emitting part, and
the control portion predefines a relation between a gain applied to the video signal and the luminance stretch quantity, determines a gain by which the output tone is reduced with respect to the input tone of the input video signal in accordance with the luminance stretch quantity, applies the determined gain to an area having a lower tone than the threshold to perform the video processing, and moves the threshold to a high-tone side as the quantity of black display detected by the black detection portion is increased in the video processing.

6. The television receiving device as defined in claim 5, wherein
the control portion reduces an increment of display luminance of the display portion by stretching of the luminance of the light source through the video processing in a predetermined area having the low feature quantity.

* * * * *